US011921730B2

(12) United States Patent
Kleiner et al.

(10) Patent No.: US 11,921,730 B2
(45) Date of Patent: *Mar. 5, 2024

(54) DEEP COMMAND SEARCH WITHIN AND ACROSS APPLICATIONS

(71) Applicant: Microsoft Technology Licensing, LLC, Redmond, WA (US)

(72) Inventors: Madeline Schuster Kleiner, Mercer Island, WA (US); Nathaniel George Freier, Seattle, WA (US); Bernhard Kohlmeier, Seattle, WA (US); Amod Anil Agashe, Bellevue, WA (US); Jignesh Shah, Redmond, WA (US); Tomasz Lukasz Religa, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,829

(22) Filed: Apr. 27, 2022

(65) Prior Publication Data

US 2022/0253449 A1 Aug. 11, 2022

Related U.S. Application Data

(63) Continuation of application No. 16/551,265, filed on Aug. 26, 2019, now Pat. No. 11,347,756.

(51) Int. Cl.
*G06F 16/2457* (2019.01)
*G06F 16/22* (2019.01)
(Continued)

(52) U.S. Cl.
CPC ........ *G06F 16/24578* (2019.01); *G06F 16/22* (2019.01); *G06F 16/248* (2019.01); *G06N 3/04* (2013.01); *G06N 3/08* (2013.01)

(58) Field of Classification Search
CPC ...... G06F 16/248; G06F 16/907; G06F 16/22; G06F 16/24578; G06N 3/04; G06N 3/08; G06N 3/045
See application file for complete search history.

(56) References Cited

U.S. PATENT DOCUMENTS 7,703,036 B2   4/2010  Satterfield et al.
8,244,721 B2 *  8/2012  Morris ............. G06F 16/90335
                                              707/723

(Continued)

OTHER PUBLICATIONS

"To Come (Publishing)", Retrieved From: https://en.wikipedia.org/wiki/To_come_(publishing), Retrieved Date: Jul. 24, 2020, 1 page.

(Continued)

*Primary Examiner* — Etienne P Leroux
(74) *Attorney, Agent, or Firm* — CALFEE, HALTER & GRISWOLD LLP

(57) ABSTRACT

Described herein are mechanisms to allow users to access functionality of applications in a suite of applications. In a first aspect, when a query relating to functionality of an application is received from a user, an index containing both top-level and sub-level functionality is searched. Results are ranked using a trained machine learning model using both context describing user interactions and the search results. A subset of the ranked results are presented to the user as options. In a second aspect the index can comprise entries describing functionality from other applications so that results presented to the user can include cross-application functionality. In a third aspect, the index can be searched using the context prior to receiving a query and adjusting the user interface based on the results. In a fourth aspect, the system can recommend other applications and/or devices that are better suited to a user's intent.

20 Claims, 18 Drawing Sheets

(51) Int. Cl.
  *G06F 16/248* (2019.01)
  *G06N 3/04* (2023.01)
  *G06N 3/08* (2023.01)

(56) References Cited

U.S. PATENT DOCUMENTS

| | | | |
|---|---|---|---|
| 8,290,939 | B2 | 10/2012 | Bouillet et al. |
| 8,948,171 | B1 | 2/2015 | George, IV et al. |
| 9,092,802 | B1 | 7/2015 | Akella |
| 9,652,109 | B2 | 5/2017 | Borzello et al. |
| 10,402,061 | B2 | 9/2019 | Kohlmeier et al. |
| 10,460,012 | B2 | 10/2019 | Kohlmeier et al. |
| 10,649,619 | B2 | 5/2020 | Chan et al. |
| 10,706,450 | B1 | 7/2020 | Tavernier |
| 10,769,551 | B2* | 9/2020 | Fujitani ............... G06N 20/00 |
| 10,791,187 | B2 | 9/2020 | Kang et al. |
| 10,810,491 | B1 | 10/2020 | Xia et al. |
| 10,867,346 | B2* | 12/2020 | Wiesinger ............... G06F 16/36 |
| 10,884,769 | B2 | 1/2021 | Chandan et al. |
| 10,929,916 | B2 | 2/2021 | Abutair et al. |
| 10,944,771 | B2* | 3/2021 | Borthakur ............... G06F 9/5061 |
| 11,036,811 | B2 | 6/2021 | Modarresi et al. |
| 11,334,720 | B2 | 5/2022 | Cason et al. |
| 2003/0098891 | A1 | 5/2003 | Molander |
| 2006/0129634 | A1 | 6/2006 | Khouzam et al. |
| 2009/0216758 | A1 | 8/2009 | Tuttle et al. |
| 2009/0327301 | A1 | 12/2009 | Lees et al. |
| 2011/0072046 | A1 | 3/2011 | Chi |
| 2011/0264785 | A1 | 10/2011 | Newman et al. |
| 2012/0143944 | A1* | 6/2012 | Reeves ............... G06F 9/451 709/203 |
| 2013/0073387 | A1 | 3/2013 | Heath |
| 2013/0124529 | A1 | 5/2013 | Jacob |
| 2014/0173426 | A1 | 6/2014 | Huang et al. |
| 2014/0188925 | A1 | 7/2014 | Skolicki |
| 2014/0201195 | A1 | 7/2014 | Kirazci et al. |
| 2014/0279078 | A1 | 9/2014 | Nukala et al. |
| 2014/0289597 | A1 | 9/2014 | Kim et al. |
| 2014/0372506 | A1 | 12/2014 | Butner et al. |
| 2014/0379826 | A1 | 12/2014 | Hertz et al. |
| 2015/0100524 | A1 | 4/2015 | Pantel et al. |
| 2015/0100562 | A1 | 4/2015 | Kohlmeier et al. |
| 2015/0149429 | A1 | 5/2015 | Chilakamarri et al. |
| 2015/0169285 | A1 | 6/2015 | Bai et al. |
| 2015/0262079 | A1 | 9/2015 | Livshits et al. |
| 2015/0347414 | A1* | 12/2015 | Xiao ............... G06N 7/00 707/749 |
| 2016/0092656 | A1 | 3/2016 | Glaser-Seidnitzer et al. |
| 2016/0182709 | A1 | 6/2016 | Kim et al. |
| 2016/0217213 | A1* | 7/2016 | Vorontcov ............... H04L 67/02 |
| 2016/0357842 | A1 | 12/2016 | Kohlmeier et al. |
| 2017/0228470 | A1 | 8/2017 | DaCosta et al. |
| 2017/0308291 | A1 | 10/2017 | Luipold |
| 2017/0337602 | A1* | 11/2017 | Davis ............... G06V 40/174 |
| 2018/0088677 | A1* | 3/2018 | Zhang ............... G06T 19/006 |
| 2018/0196665 | A1* | 7/2018 | Yao ............... G06F 8/71 |
| 2018/0203863 | A1* | 7/2018 | Hansson ............... G06Q 30/0275 |
| 2018/0322221 | A1* | 11/2018 | Ambale ............... G06F 16/9038 |
| 2018/0349382 | A1 | 12/2018 | Kumaran et al. |
| 2019/0042976 | A1 | 2/2019 | Tanglertsampan et al. |
| 2019/0087691 | A1 | 3/2019 | Jelveh |
| 2019/0188295 | A1 | 6/2019 | Sirotkovic et al. |
| 2019/0197359 | A1* | 6/2019 | Haneda ............... G06N 3/08 |
| 2019/0251153 | A1 | 8/2019 | Fournier et al. |
| 2019/0294629 | A1 | 9/2019 | Wexler et al. |
| 2019/0347356 | A1* | 11/2019 | Lindquist ............... G06F 16/638 |
| 2019/0384622 | A1 | 12/2019 | Chen et al. |
| 2020/0005191 | A1 | 1/2020 | Ganti et al. |
| 2020/0019418 | A1* | 1/2020 | P K ............... G06F 17/18 |
| 2020/0097560 | A1* | 3/2020 | Kulkarni ............... G06F 16/248 |
| 2020/0159862 | A1 | 5/2020 | Kleiner et al. |
| 2020/0183884 | A1 | 6/2020 | Kohlmeier et al. |
| 2020/0226418 | A1 | 7/2020 | Dorai-Raj et al. |
| 2020/0341815 | A1* | 10/2020 | Manchale Sridhar . G06N 20/00 |
| 2020/0344185 | A1 | 10/2020 | Singaraju et al. |
| 2020/0371825 | A1 | 11/2020 | Matthew |
| 2020/0380389 | A1 | 12/2020 | Eldeeb et al. |
| 2020/0387823 | A1* | 12/2020 | Yao ............... G06F 11/3438 |
| 2021/0004682 | A1 | 1/2021 | Gong et al. |
| 2021/0064627 | A1 | 3/2021 | Kleiner et al. |
| 2021/0073293 | A1 | 3/2021 | Fenton et al. |
| 2021/0224306 | A1 | 7/2021 | Choudhary et al. |
| 2022/0043964 | A1 | 2/2022 | Stenerson et al. |
| 2023/0117206 | A1 | 4/2023 | Venkateshwaran et al. |

OTHER PUBLICATIONS

"Recognizing Semantic Formatting Information in a Document", In Publications of IP.com, Dec. 13, 2017, 35 Pages.

"Non-Final Office Action Issued in U.S. Appl. No. 16/988,277", dated Feb. 3, 2021, 10 Pages.

"Office Action for U.S. Appl. No. 16/551,265", dated Jun. 4, 2021, 46 pages.

"International Search Report and Written Opinion issued in PCT Application No. PCT/US21/030769", dated Aug. 9, 2021, 15 pages.

"Final Office Action Issued in U.S. Appl. No. 16/988,277", dated Jul. 29, 2021, 12 pages.

"Response to the Office Action for U.S. Appl. No. 16/551,265", filed Dec. 3, 2021, 17 pages.

"Notice of Allowance and Fees Due for United Stated U.S. Appl. No. 16/551,265", dated Jan. 27, 2022, 7 pages.

"Corrected Notice of Allowability for U.S. Appl. No. 16/551,265", dated Apr. 4, 2022, 2 pages.

"Non-Final Office Action Issued In U.S. Appl. No. 16/988,277", dated Feb. 18, 2022, 12 pages.

"Final Office Action Issued in U.S. Appl. No. 16/988,277", dated Aug. 17, 2022, 9 Pages.

"Notice of Allowance Issued in U.S. Appl. No. 16/988,277", dated Oct. 4, 2023, 13 Pages.

"Non Final Office Action Issued in U.S. Appl. No. 16/988,277", dated Mar. 17, 2023, 9 Pages.

\* cited by examiner

DEEP COMMAND SEARCH WITHIN AND ACROSS APPLICATIONS

RELATED APPLICATION

This application is a continuation of U.S. patent application Ser. No. 16/551,265, filed on Aug. 26, 2019, and entitled "DEEP COMMAND SEARCH WITHIN AND ACROSS APPLICATIONS", the entirety of which is incorporated herein by reference.

FIELD

This application relates generally to improvements in application search and application user interfaces. More specifically, this application relates to improvements in searching for commands within and across applications and user interfaces related to such searches.

BACKGROUND

Currently, several applications are sold or licensed as a "suite" of related applications. For example, a suite of productivity applications may include a word processor, a spreadsheet program, a presentation program, and so forth. As another example, a suite of graphics programs may include a video editing program, a cinematic visual effects editor, an animation creator, a vector graphics illustrator, photo editing, and so forth. The individual applications within a suite may include both common and overlapping functionality. For example, two applications may allow a user to edit drawings, but only one allows a user to edit photos.

As the functionality of these suites of applications have grown, so has the number of commands, options, and so forth contained within the applications. Users of such suites often are confused as to where certain functionality can be accessed and how to accomplish certain tasks within an application. Furthermore, where multiple applications can provide the same functionality, it can be confusing for a user to select the "best" application to accomplish a task. While applications often provide a "help" feature where users can search for help on what they are doing, the help features often do not provide the information the user is searching for.

It is within this context that the present embodiments arise.

DETAILED DESCRIPTION

Figure 1:
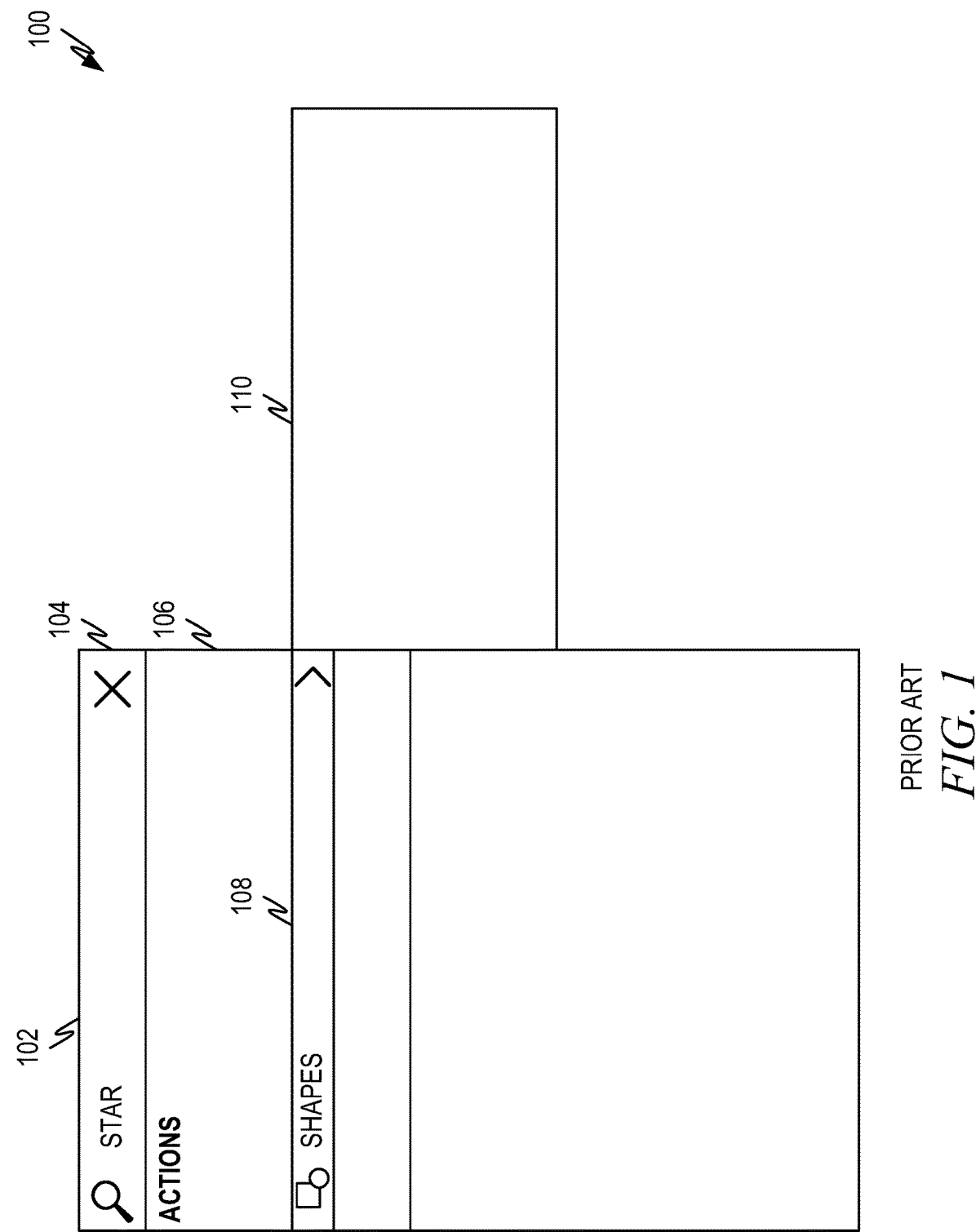
FIG. 1 illustrates an example prior art search user interface.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Applications that have numerous features and functionality have correspondingly complex user interfaces to allow users to access the corresponding features and functionality. The user interfaces are often several levels "deep" with top level functionality being backed up by sub-level functionality at various sub-levels. Users use the user interfaces to accomplish desired tasks and achieve desired outcomes. For example, if a user is using a productivity application such as a word processor and desires to insert a table, the user typically accesses a top-level function that allows a user to insert a table. Sub-level functionality is then accessed to specify the number of rows and/or columns that should be included in the table. As another example, when a user desires to insert a shape, the user first accesses top-level functionality that allows a shape to be inserted and then accesses sub-level functionality that allows the user to specify what shape should be inserted (square, line, star, etc.) and any additional properties needed to define the shape.

Numerous strategies have been developed to make it easier for users to discover and use the numerous features and functionality of an application. For example, functions/features can be gathered into categories such as a top-level menu or category. Thus, an "insert" category may gather various items that can be inserted in the menu or category, for example. Sub-level functionality can be presented, for example in fly-out panes attached to a top-level function. Thus, selecting an "insert shape" function can lead to a fly-out pane that allows a desired shape to be selected from a gallery or other collection, for example.

Sometimes, a search function is provided that allows a user to search for a particular feature or function. Thus, a user can type what they want to accomplish into a search bar and the application will attempt to ascertain an intent and/or outcome from the query/query prefix and provide the user with a way to access the functionality associated with the intent/outcome. However, current implementations of such a search function often either do not correctly interpret the user's intent/outcome or provide options that are less than helpful. Due to the complexity of the functionality provided by the application both at the top level and at sub-levels, such search functions are limited to surface top-level commands. For example, if a user types in "Font," the search service will surface the "Font" command but does not surface other sub-level commands associated with a "Font" query prefix. Furthermore, there exists the technical problem of preserving top level context when surfacing sub-level commands. Even if sub-level commands are surfaced using current search services, without sufficient context about where the sub-level command fits into the top level hierarchy, the command becomes detached and not understandable to the user. In short, the currently existing search services in applications do not allow the user to search for specific items or parameters within the top-level command and/or sub-level commands and parameters associated therewith.

Thus, there exists the technical problem of making the complex commands, features, and functions of an application easily discoverable and accessible to users. Current approaches do not solve this problem. Embodiments of the present disclosure make more commands, features, functions and so forth in an application more easily discoverable and accessible. As used herein, the terms "functionality" or "items" (often used interchangeably) will be used to refer to one or more of commands, features, and functions of an application. "Functionality" and/or "items" can have associated parameters. For example, a command to insert a table may have associated parameters such as how many columns and rows the table should contain. Alternatively, the parameters such as columns and rows may be sub-level items of the insert table command.

In a first aspect, embodiments of the present disclosure allow users to search not only for top-level items and parameters, but sub-level items and parameters. As used herein, top-level items and parameters are those that are initially accessible, while sub-level items and parameters are those that are accessible once a top-level command is selected. As an example, a top-level item may be "Font" while sub-level items allow a particular font, font size, font format, and so forth to be selected. As another example, a top-level command may be "insert shape" while a sub-level command may be the various shapes that can be inserted along with their formats, and other parameters.

Embodiments of the present disclosure index not only top-level items and parameters but sub-level items and parameters. The index thus contains top-level functionality/parameters as well as sub-level functionality/parameters. When a user types in a query prefix, the system ascertains the intent of the user and searches the index. The retrieved results are ranked through one or more layers of ranking and selection to select a subset of the results that are most relevant to the intent of the user.

In one embodiment a trained machine learning model is used to rank the results. The machine learning model is trained using user context from the user, a collection of users (such as the users from a common tenancy), or all users and the results. Training can be accomplished using either a supervised or unsupervised learning process.

As used herein user context includes the interactions that the user has with the application such as the tasks the user has performed, content created by the user, commands accessed by the user, parameters entered, when the user entered/accessed an item, how long between accessing items, whether the user spent time looking through menu hierarchies before accessing an item, and so forth. The user context is a rich source of information that can give clues as to what the user wants to accomplish. This, in turn, can be used to train the machine learning model.

A subset of the ranked search results can be selected and presented to the user in the user interface.

In suites of applications, a set of applications having related purposes are packaged, sold, licensed, or otherwise made available as a collection. For example, a suite of productivity applications may include a word processor, a spreadsheet program, a presentation program, and so forth. As another example, a suite of graphics programs may include a video editing program, a cinematic visual effects editor, an animation creator, a vector graphics illustrator, photo editing, and so forth. The individual applications within a suite may include both overlapping and non-overlapping functionality. For example, two applications may allow a user to edit drawings, but only one allows a user to also edit photos. Because of the overlapping functionality between applications it can sometimes be difficult for users to know which application in a suite is the best tool for accomplishing a particular intent. In this context, the best tool is the application whose functionality will most closely effectuate the user's intent and achieve the user's desired outcome.

There exists a second technical problem of making the user aware of which application will most closely effectuate the user's intent and/or achieve the user's desired outcome. Embodiments of the present disclosure identify when another application would be better suited to effectuate the user's intent and/or achieve the user's desired outcome.

In a second aspect of the embodiments of the present disclosure, one application identifies when the user's intent and/or the user's desired outcome would be better accomplished by a different application. To avoid having to repeat the phrase "user's intent and/or user's desired outcome" the disclosure will simply refer to effectuating a user's intent with the understanding that effectuating the user's intent also refers to accomplishing the user's desired outcome either in a conjunctive or disjunctive manner (e.g., and/or). As used herein, "intent" refers to what a user wants to accomplish. Thus, intent can be a complex task such as create a resume, or a less complex task such as access a particular command or function.

Embodiments of the present disclosure can make information available between applications so that a currently executing application can ascertain when a user's intent is better served by another application. This can involve a registration process and/or a process where one application passes information to another application to retrieve information from that application so that relative capabilities can be assessed and presented to the user. When a user selects a presented option for another application, a handoff between applications occurs.

There exists another technical problem in that certain device form factors are better suited to certain tasks than others. For example, although a user may have similar applications that execute on a phone and a laptop, it may be easier to effectuate the user's intent on the laptop than the phone. This technical problem includes identifying the best form factor to effectuate the user's intent and helping the user select the best form factor.

In another aspect of the embodiments of the present disclosure, an application can identify when a different device form factor is better suited to effectuating the user's intent than the current device form factor. An application can be made aware of the form factors available to the user. When the user attempts to perform an operation that is better handled on a different form factor, the device can suggest transferring to the other form factor, can put a placeholder in the current document, can note an unfinished task that will be finished on another form factor, or any combination thereof. For example, a user creating a document on a smaller form factor may want to enter an equation into the document. However, the small form factor is not well suited to entering an equation and such would be better handled on a form factor with a larger screen, a mouse, and so forth. The application can suggest to the user that the task be completed on another form factor and either allow the user to transfer directly to the other form factor to continue work there or can insert a place holder into the document so that the user can continue working on the smaller form factor and then go back and finish replacing the place holder on the larger form factor.

There exists yet another technical problem to minimize the effort the user has to expend to access desired functionality of the application.

As noted above, when a user is unsure as to how access functionality, the user can type a query into a search bar and receive results about how to effectuate the intent behind the query. In another aspect of the embodiments of the present disclosure, the application can adjust the user interface, recommend search results, or both before a user begins typing a query into the search bar. In these embodiments, the system can monitor the user context and use a trained machine learning model as previously described to rank a set of search results, select a subset of the ranked search results, and change the user interface, recommend search results, or both based on the selected subset.

The following description describes these and other aspects of the embodiments in the present disclosure in greater detail.

Description

Prior Art Search User Interfaces

FIG. 1 illustrates an example prior art search user interface 100. The search user interface contains a user interface 102 that comprises a search bar 104 and one or more results areas 106. In order to identify how to access desired functionality of the application, the user types a query into the search bar 104. In the illustrated example, the user desires to insert a star into the document they are working on. The user thus types "star" into the search bar 104.

Unknown to the user, inserting a star is a sub-level functionality and thus cannot be discovered by the query. In the "Actions" portion of the results area identified search results are displayed. In the example, since the query references a sub-level functionality, the system displays the top-level command of "Shapes" 108. The user may or may not recognize the presented result "shapes" 108 as a relevant response to the query. However, if the user selects the shapes 108 result, the system can display the sub-level gallery 110 which can contain the various shapes that the user can insert. The star shape can be part of the gallery 110 and thus if the user knows to open the gallery, the user can locate the desired functionality.

Figure 2:
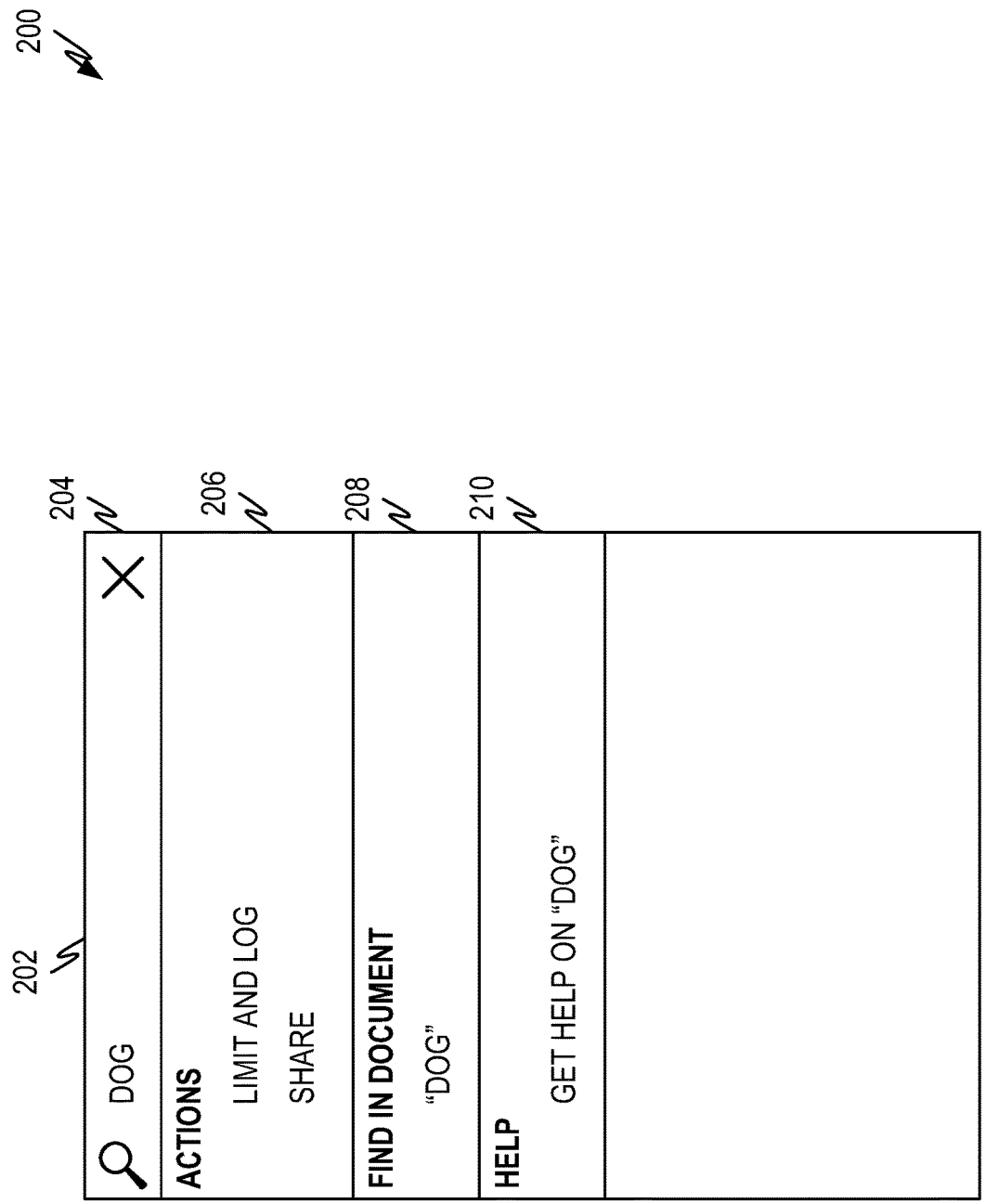
FIG. 2 illustrates another example prior art search user interface.

In this example, it is apparent that whether the user is successful or not depends on whether the top-level result is associated with a desired sub-level functionality in the query index. This, however, is not a guarantee (as illustrated in FIG. 2). Additionally, whether the user is successful or not in locating the desired functionality depends on a user recognizing the relationship between the top level functionality and the desired sub-level functionality. Thus, some users may be successful in locating the sought after functionality while others may not be successful.

This illustrates one problem with the approach to the prior art to using search to locate functionality specified in a search query. The prior art approach relies on a user to perceive and recognize relationships in order to allow the user to be successful in locating desired sub-level functionality.

FIG. 2 illustrates another example prior art search user interface 200. The user interface 202 comprises a search bar 204, and multiple results areas that include an "actions" area 206, a "find in document" area 208, and a "help" area 210.

In this example, suppose a user wishes to locate an icon/clip art of a dog and thus types "dog" into the search bar. In this instance, although an icon of a dog is available in the sub-levels of functionality, the sub-level of functionality has not been associated with any top level functionality. Thus, the sub-level functionality that would allow the user to locate a dog icon is totally invisible to the user. Thus, the search system attempts to discern the user's intent and presents the illustrated results, none of which actually effectuate the user's intent.

This illustrates yet another problem with the approach taken by the prior art. The sub-level functionality is simply not accessible through the search bar.

Deep Command Search Within an Application

Figure 3:
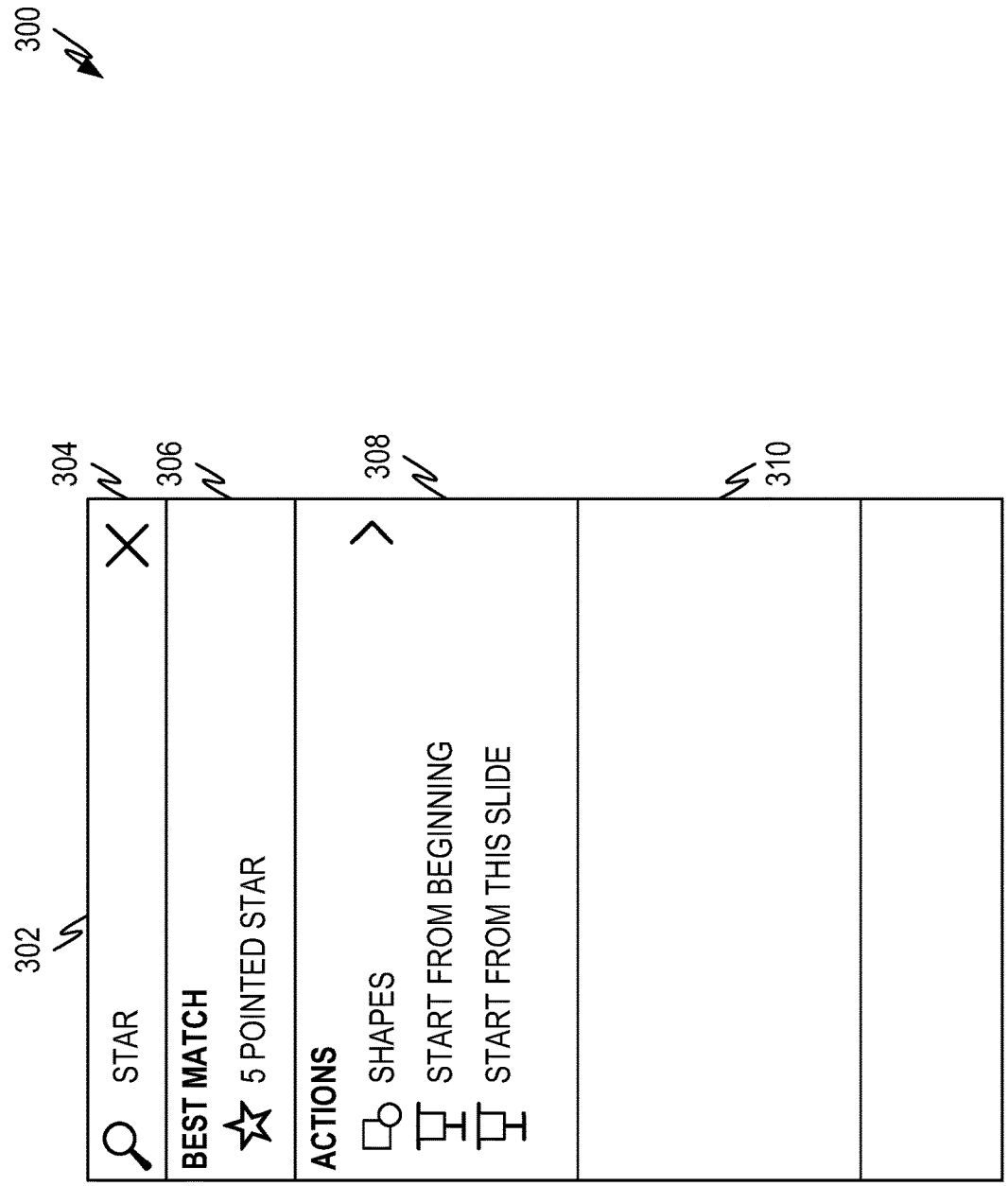
FIG. 3 illustrates an example search user interface according to some aspects of the present disclosure.

FIG. 3 illustrates an example search user interface 300 according to some aspects of the present disclosure. In this example the user interface of this embodiment 302 comprises a search bar 304 and multiple results areas 306, 308, 310, where different types and/or categories of results can be presented to the user.

In this example, the user desires to enter a star into the document. Thus, the user types "star" into the search bar 304. Unlike the prior art, embodiments of the present disclosure can directly identify the sub-level functionality. Thus, embodiments of the present disclosure can surface "5 pointed star" as a direct result, even when the shape is part of a gallery or other sub-level functionality. Selecting the surfaced command will result in insertion of a 5 pointed star.

Note that since there may be multiple types of stars, the embodiments of the present disclosure can identify not only a general sub-level functionality (for example all the stars the system has), but also a specific sub-level functionality (for example the 5 pointed star as the best match).

Other related results can be presented in other areas of the search results. For example, associated top level functionality can be displayed in an actions area 308. Thus, if the "shapes" command is the top level functionality associated with the 5 pointed star sub-functionality, the top level functionality can be presented to allow a user to select different sub-level functionality if desired. Additionally, or alternatively, the system can present other sub-level functionality that also responds to the "star" query. As discussed in greater detail below, a ranking and selection process that identifies top results for presentation in the UI.

Figure 4:
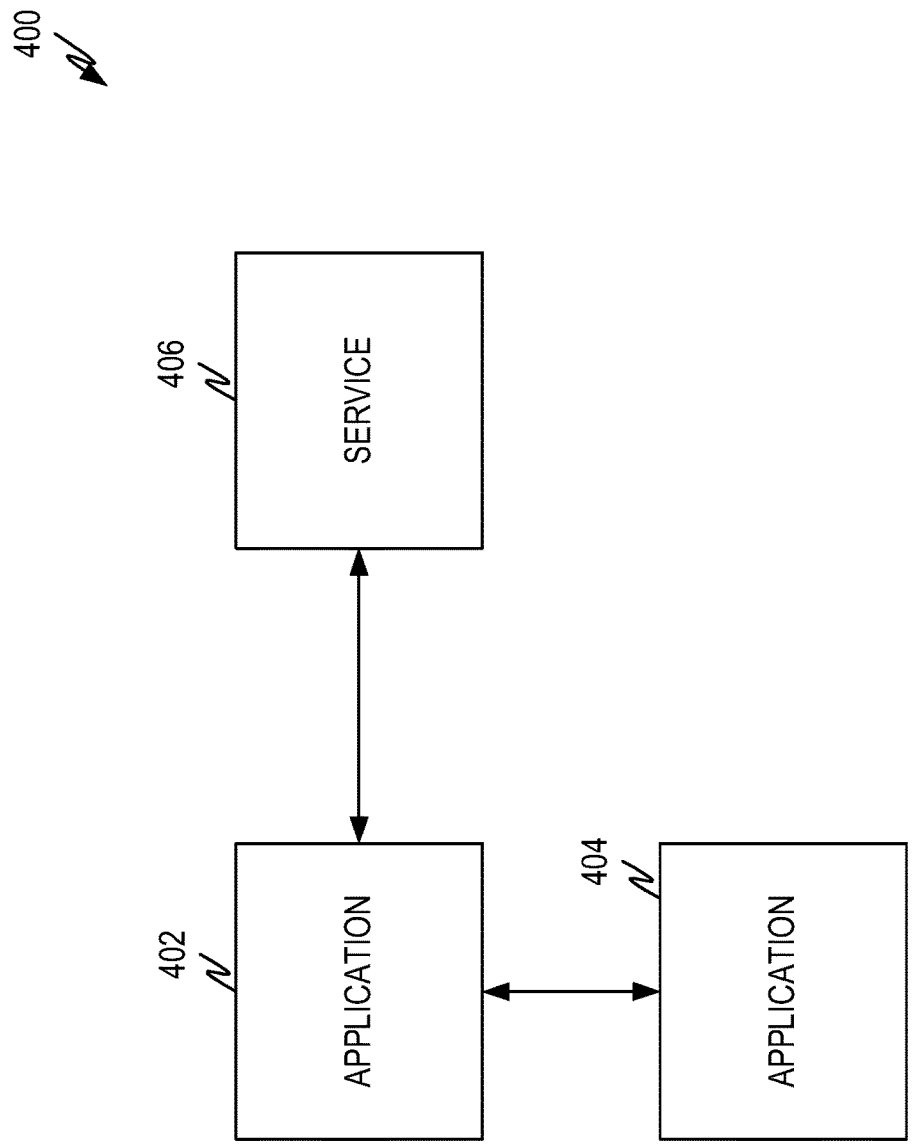
FIG. 4 illustrates a representative architecture according to some aspects of the present disclosure.

FIG. 4 illustrates a representative architecture 400 according to some aspects of the present disclosure. The architecture 400 is presented to provide a context for the other architectures presented herein. Embodiments of the present disclosure refer to an application such as 402, 404. The application encompasses the functionality as described herein.

The applications 402, 404 can execute on one or more different device form factors, either in the same version or in a different version. For example, an application 402 may execute on multiple different device form factors. Additionally, or alternatively, an application 402 may have one version that executes on a first device form factor and a second version that executes on a second device form factor. For example, one version of the application 402 may execute on a tablet type device while another version of the application 402 may execute on a phone type device. Device form factor includes any type of device such as a laptop type device, a desktop type device, a tablet or slate type device, a phone type device, a wearable type device, a device incorporated into a vehicle or other item, a server accessed over a network, and so forth. An example of a server accessed over a network includes a situation where the main application 402 executes on the server and is accessed via a user interface on another device connected to the server over a network, such as in some types of "online" productivity applications like Google® Docs or certain versions of Microsoft® Office.

One or more of the embodiments of the present disclosure allow handover from one application 402 to another application 404. These applications can be separate types of applications (e.g., a photo editing application and a video editing application), or can be the same type of application (e.g., two word processing applications). The applications can run on the same device form factor or different device form factors.

Additionally, or alternatively, one or more of the applications 402, 404 can execute on one device and then access one or more services located on the same or a different device to provide part of the functionality. For example, some embodiments described below use a service to provide search and/or ranking and selection functionality. As another example some functionality of the application may access a service online to provide some of the "built-in" application functionality. For example, an application may retrieve various templates (or other items) from an online template repository (or other repository).

Figure 5:
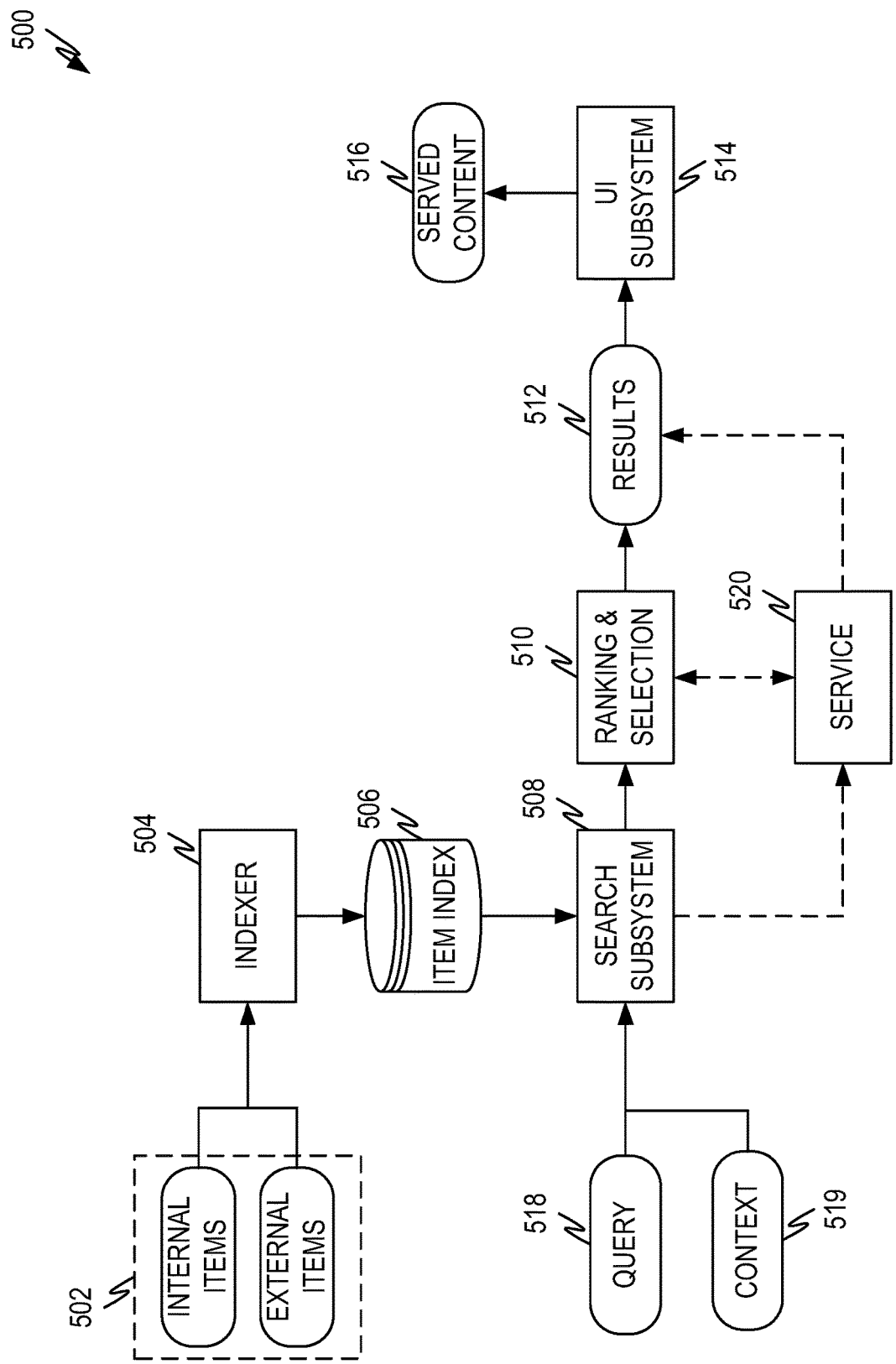
FIG. 5 illustrates a representative architecture according to some aspects of the present disclosure.

FIG. 5 illustrates a representative architecture 500 according to some aspects of the present disclosure. The architecture 500 describes a representative embodiment for incorporating search capability that allows sub-level functionality to be directly searched and presented to a user via a user interface.

Prior to a search being performed an item index 506 is built. The item index 506 comprises entries for top level and sub-level functionality. The item index 506 can also capture relationships between items, if desired. Thus, a relationship between a sub-level functionality and a top-level functionality can be captured in some embodiments. In some embodiments such relationships are not captured in the item index 506.

An indexer 504 consumes a body of internal and/or external content 502 and creates the item index 506 in much the same way that a search engine creates a search index from crawled web pages or other documents. The internal content includes both top level functionality and sub-level functionality. As a representative example, internal content of a productivity application (word processor, spreadsheet application, presentation application, etc.) can include any combination of:

Top level items and/or parameters associated therewith; and

Sub-level items and/or parameters associated therewith.

Parameters associated with top level items and/or sub-level items can include can include any combination of the following representative examples:

Color in color galleries such as font color, highlight color, page color, shape color, and so forth;

Shape types;

Font styles;

Border styles;

Text effects;

Header/footer style;

WordArt style;

Symbol type;

Document formatting type;

Paragraph spacing;

Margin;

Page Size;

Function name (for built in functions such as in spreadsheet applications)

Cell merge type;

Conditional formatting type;

Chart type;

Object arrangement type; and

Any other type of parameters provided by the application.

External content can include any content that is pulled by the application from a non-internal source. For example, often applications can access content (templates, clip art, photo transformations, setting groups, etc.) from an external source. The application can pull information on these external items and include it in the item index so that they can be used just like internal items.

Figure 6:
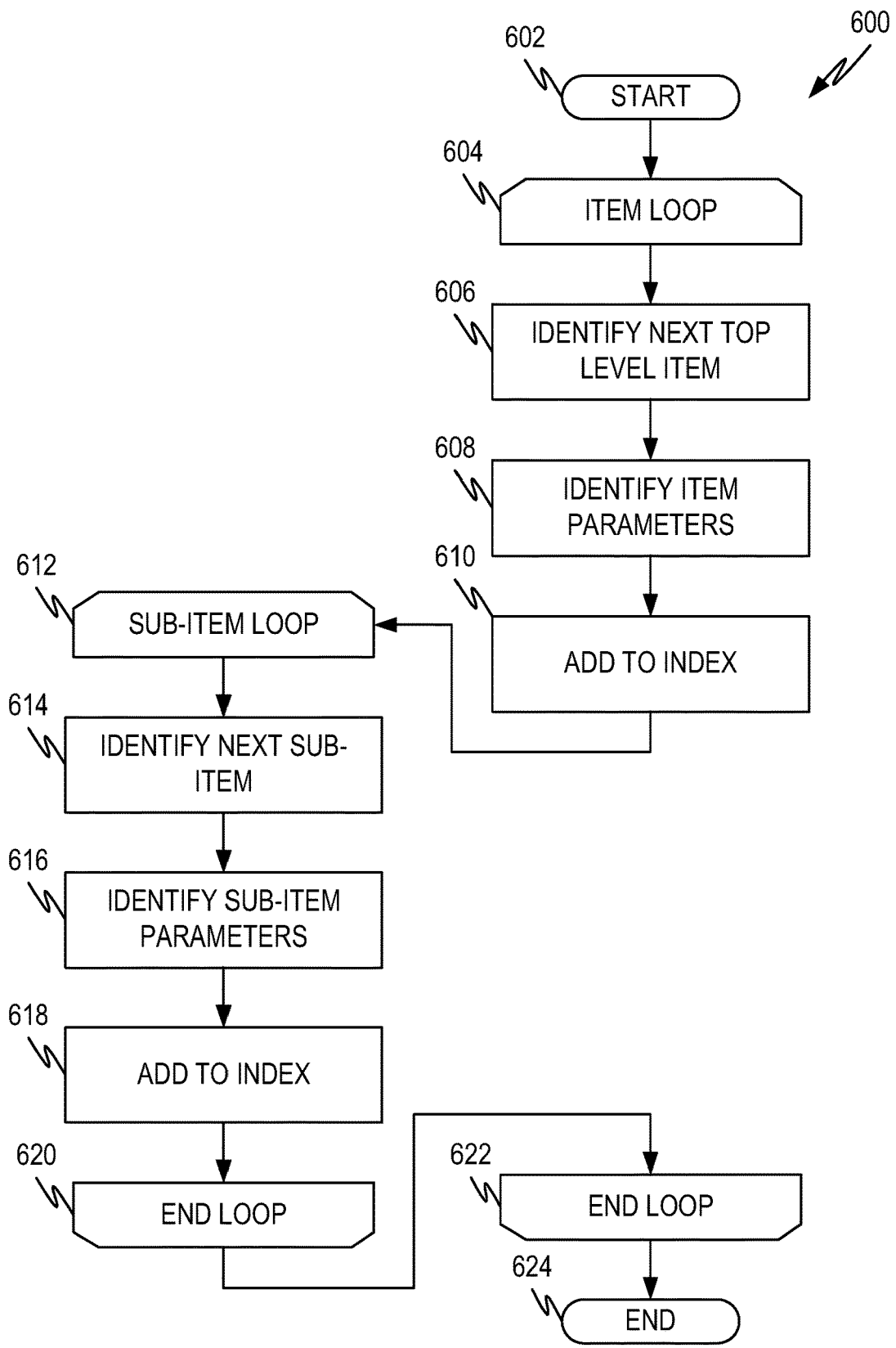
FIG. 6 illustrates an example flow diagram for indexing commands and functions according to some aspects of the present disclosure.

FIG. 6 illustrates an example flow diagram for indexing internal and/or external content.

A user enters a query or query prefix 518 into a search bar or other UI element as provided by the application. In this disclosure, the term "query" will be used to refer to both a completed query and a query prefix. The query 518 represents something the user is trying to do (e.g., a user intent). The search subsystem 508 searches the item index 506 based on the query 518 and/or user context 519. The search subsystem 508 can search the item index 506 as is known in the art and thus no further description of how that is accomplished is needed.

A subset (e.g., all or part) of the results of the search are sent to the ranking and selection process 510 which ranks the subset and selects a further subset for presentation to the user. The ranking and selection process can utilize one or more rounds of ranking and selection. Thus, multiple rankers can be combined in some embodiments where a less computationally intensive ranker is first used to rank the items. Afterward, the number of items in the subset is reduced to a more manageable number based on the initial ranking before employing a more computationally intensive ranker on the remainder. Multiple rounds of ranking and selection are employed in some embodiments, while only a single ranking/selecting round is employed in other embodiments.

In some embodiments one or more trained machine learning models are used for ranking the subset from search subsystem 508. Machine learning operates by building a model from example training data in order to make data-driven predictions or decisions expressed as outputs or assessments. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN) including deep neural networks (DNN), matrix factorization, and Support Vector Machines (SVM) tools may be used for classifying and/or ranking search results.

In one embodiment a deep neural network (DNN) can be used. The DNN can comprise an embedding layer, one or more convolutional layers, a dropout layer, and one or more fully connected (e.g., Dense) layers. The final layer is an output layer that calculates a ranking score.

In some embodiments, example machine-learning models provide search result rank (e.g., a number or score) to identify how likely it is that the result is relevant to the intent expressed by the user in the query 518 and/or user context 519. The machine-learning models utilize the training data to find correlations among identified features that affect the outcome.

The machine-learning models evaluates training data during a training process to find correlations among the input data that affect the outcome or assessment. Training is accomplished either through a supervised or non-supervised process. In a supervised process, the training data is labeled so that the desired outcome for a particular input data point is known (e.g., captured in the labeling). Labeling training data is sometimes referred to as annotated training data. In an unsupervised process, unlabeled training data is used in the training process. Embodiments of the present disclosure can utilize supervised or unsupervised training data, depending on the particular machine learning model selected for use as a ranker.

Embodiments of the present disclosure utilize user context data as training data. As discussed above, user context includes among other things the user interactions with the application. User interactions include, but are not limited to, commands the user has accessed, data the user has input into a document created by the user via the application (e.g., a word processing document, edited photo, spreadsheet, and so forth). The user context provides a rich source of signals that can give a strong indication of user intent. In some embodiments user context is combined with the query.

To create training data, queries entered by a user can be captured along with user context. Subsequent user interactions can then be monitored to identify the user's actual intent. For example, if the user has performed a series of actions and then enters the query "Font". The system presents a set of search results based on the query. Subsequently, the user ignores the search results and hunts until the font style command is activated, this is a strong signal that the user's intent was to open the font style command. If the user had selected one of the search results, that would be an indication that the user's intent was to activate the indicated selection.

To provide unbiased training data, in some embodiments some of the choices presented can be suboptimal or even random. These suboptimal/random choices can be presented alongside choices produced by the machine learning model. If the user clicks on a suboptimal/random choice, this can be an indication that such a choice may have been better than the choices from the machine learning model. This data can be used to adjust the weights and/or coefficients of the machine learning model to better reflect user intents.

The combination of user context (interactions, and so forth as defined herein), the query, and what the user actually did (activate the font style command) can be combined into a training data point. This training data point represents annotated data because of the inference of what the "correct" answer is from what the user does after the search results are presented. Collection and aggregation of the training data points into a set of training data can be performed over time. The training data can be used for initial training and/or for updating the model weights and parameters in a feedback loop.

Training data can be aggregated across different groups of users to train different ranking models customized to larger or smaller groups of users. For example, to gain a large amount of training data, training data across all users can be aggregated and used to train a baseline ranking model. This model can then be used for all users and/or further customized as described herein. Additionally, or alternatively, training data can be aggregated across a tenancy to train a ranking model customized to the tenancy. A tenancy is a group of users that use a common installation from a service provider's point of view, such as a company, department, and so forth. Additionally, or alternatively, training data can be aggregated based on common user characteristics. Additionally, or alternatively, training data can be aggregated for a particular user. The training data aggregations can occur at one or more levels in any combination.

The training data aggregated at one level can be used to train a ranking model at that level or can be used to further customize a model trained at a different aggregation level. For example, in one embodiment training data aggregated for a group of users sharing one or more common characteristics can be used to train a model used for that group. Alternatively, the system can start with a model trained using data aggregated across all users and the further customize the model to the group of users by using the training data aggregated across the group to adjust the weights and other parameters of the machine learning ranking model in a feedback loop.

The search process 508 and/or the ranking and selection process 510 can occur on the device executing the application or on another device that executes one or more services 520 to perform the appropriate computations. If the search process 508 is provided by a remotely executing service, item index 506 may reside where the service executes or be made available to the remotely executing service. Additionally, or alternatively, some aspects can be performed on the device executing the application while other aspects can be performed via a remotely executing service 520. For example, in a first configuration, a trained machine learning model is passed from a service to the application executing on the local device. The trained machine learning model is then used by the local ranking and selection process 510 to rank and select the appropriate number of items 512 for presentation to the user. In another example, in a second configuration, the search subsystem 508 can pass search results and/or user context to a remotely executing service 520. The remotely executing service can perform some aspects of ranking and selection of the results and then pass the remainder of the results back to the locally executing ranking and selection process 510 for final ranking and/or selection. The local ranking and selection process 510 can utilize one or more ranking models, at least one of which can be a trained machine learning model as described herein. As yet another example, in a third configuration, the search subsystem 508 can pass search results and/or user context to the remotely executing service 520. The remotely executing service can perform the entirety of the ranking and selection process and can return the appropriate number of results 512 for presentation to the user.

The output of the ranking and selection process (either local, remote, or a combination thereof) is an appropriate number of ranked items 512 which are then presented 516 to the user via a user interface 514.

FIG. 6 illustrates an example flow diagram 600 for indexing items according to some aspects of the present disclosure. The flow diagram 600 shows an example method for indexing both top level items and/or parameters and sub-level items and/or parameters.

The method begins at operation 602 and proceeds to operation 604 which opens a loop that loops across all top level items and/or parameters. Operation 606 identifies the next top level item. Operation 608 identifies parameters associated with the top level item. Operation 610 creates an index entry for the top level item and/or its parameters. The index and index entry can be in any format that allows a search to be made of the index with a query as specified herein. Thus, in some embodiments, index entries can comprise information such as keywords, intents, and so forth that can be used to retrieve the appropriate index entries for a given query.

Operation 612 opens a loop that loops across all sub-level items and/or parameters associated with the top level item and/or parameters of operation 606 and/or 608.

Operation 614 identifies the next sub-level item and operation 616 identifies parameters associated with the sub-level item. In operation 618, an index entry is made for the sub-level item and/or its parameters. As above, index entries can comprise information such as keywords, intents, and so forth that can be used to retrieve the appropriate index entries for a given query. Additionally, or alternatively, the index entries created by operation 610 and/or 614 can capture item and/or parameter relationships in any combination (top level/top level, top level/sub level, sub-level/sub-level). Additionally, or alternatively, the index entries can capture one or more categories that the item and/or parameter falls into.

Figure 7:
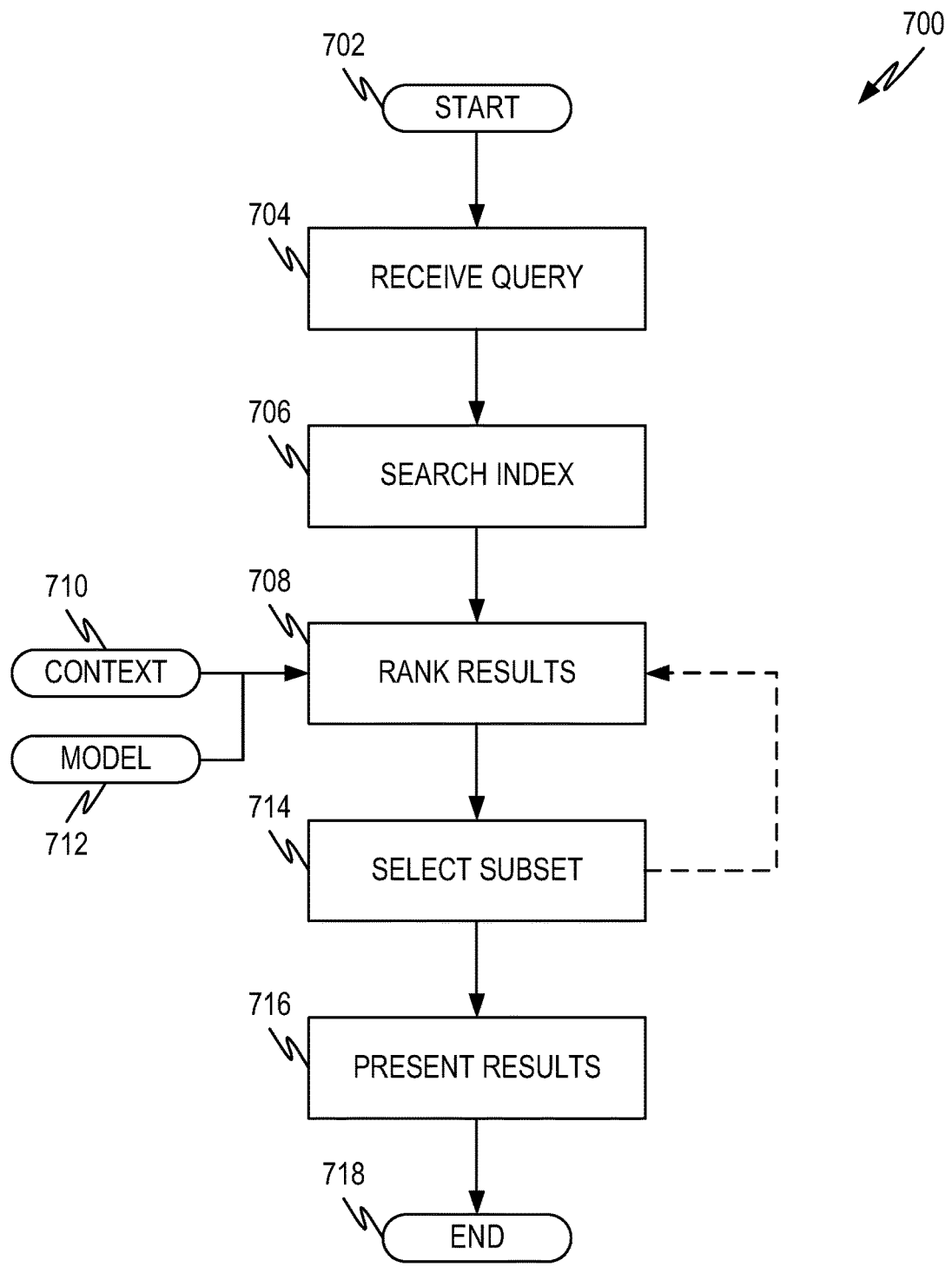
FIG. 7 illustrates an example flow diagram for ranking and selecting search results according to some aspects of the present disclosure.

FIG. 7 illustrates an example flow diagram 700 for ranking and selecting search results according to some aspects of the present disclosure. This is a representative flow diagram, for example, for operation of search subsystem 508, ranking and selection process 510, and/or service 520.

The flow diagram begins at operation 702 and proceeds to operation 704 where the query is received. As discussed herein, the query expresses the user intent and the term query covers both a completed query and a query prefix.

In operation 706 the query is used to search the item index (e.g., item index 506) and collect a set of search results that are relevant to the query. The search process can be performed as known in the art and thus needs no further explanation.

Once the set of search results are obtained from operation 706, a subset (e.g., all or less than all) of the set is put through one or more rounds of ranking and selection as indicated in operations 708 and 714. In some embodiments, at least one of the rounds of ranking is performed with a trained machine learning model as discussed above. Since multiple trained machine learning models can exist for ranking as described above, the method can select the model for the current round of operation. This is indicated by model input 712. The model can be selected based on user, user context (e.g., 710), the round of ranking (when multiple rounds are used), and/or other criteria.

As discussed above, user context 710 can be used to rank items in the current subset under consideration. In some embodiments, the machine learning model receives as an input some or all of the user context 710, the query and/or user intent, and/or the item(s) to be ranked. The machine learning model and produces as an output a ranking and/or category for the item(s) under consideration.

Operation 714 selects a subset of the ranked search results either for the next round of ranking and selection (e.g., the dashed line in the flow diagram) or for presentation to the user. The selection is made according to one or more selection criteria. The selection criteria can include any selection criteria that yields the desired number of items, either for the next round or for presentation, as the case may be.

On selection criteria is to select the top N results, where N is greater than or equal to one. In some embodiments, N is also less than some upper limit. Another possible selection criteria is to select all items with a ranking over a set threshold. Another possible selection criteria is to select a certain number of results in one or more categories. Combinations of selection criteria are also used in some embodiments.

Operation 716 causes the results to be presented to the user as described herein in one or more user interfaces. The method ends at operation 718.

Deep Command Search Within and External to an Application

In some embodiments of the present disclosure, deep item search is not limited to internal content. The deep item search can include external items. External items comprise items that the application accesses from outside the application as well as items from other applications. For example, suppose a collection that is part of a sub-level item is retrieved from outside the application. The collection can be indexed so that items in the collection can be surfaced as disclosed herein. In another example, perhaps the user query is "compile a photo collection." The application can identify that a different application is better suited to the user's intent to create a photo album containing a collection of photos. In such a situation, the application can recommend that the task be completed using a different application and facilitate the transfer to that application. In yet another example, perhaps the application is capable of effectuating the user's intent, but the intent would be better effectuated using the application on another form factor. Thus, if the user is creating a document on a form factor that has no touchscreen or stylus and the user enters the query "insert freehand drawing," the application can recommend that the intent would be better effectuated on a device form factor that included a touchscreen and stylus.

Figure 8:
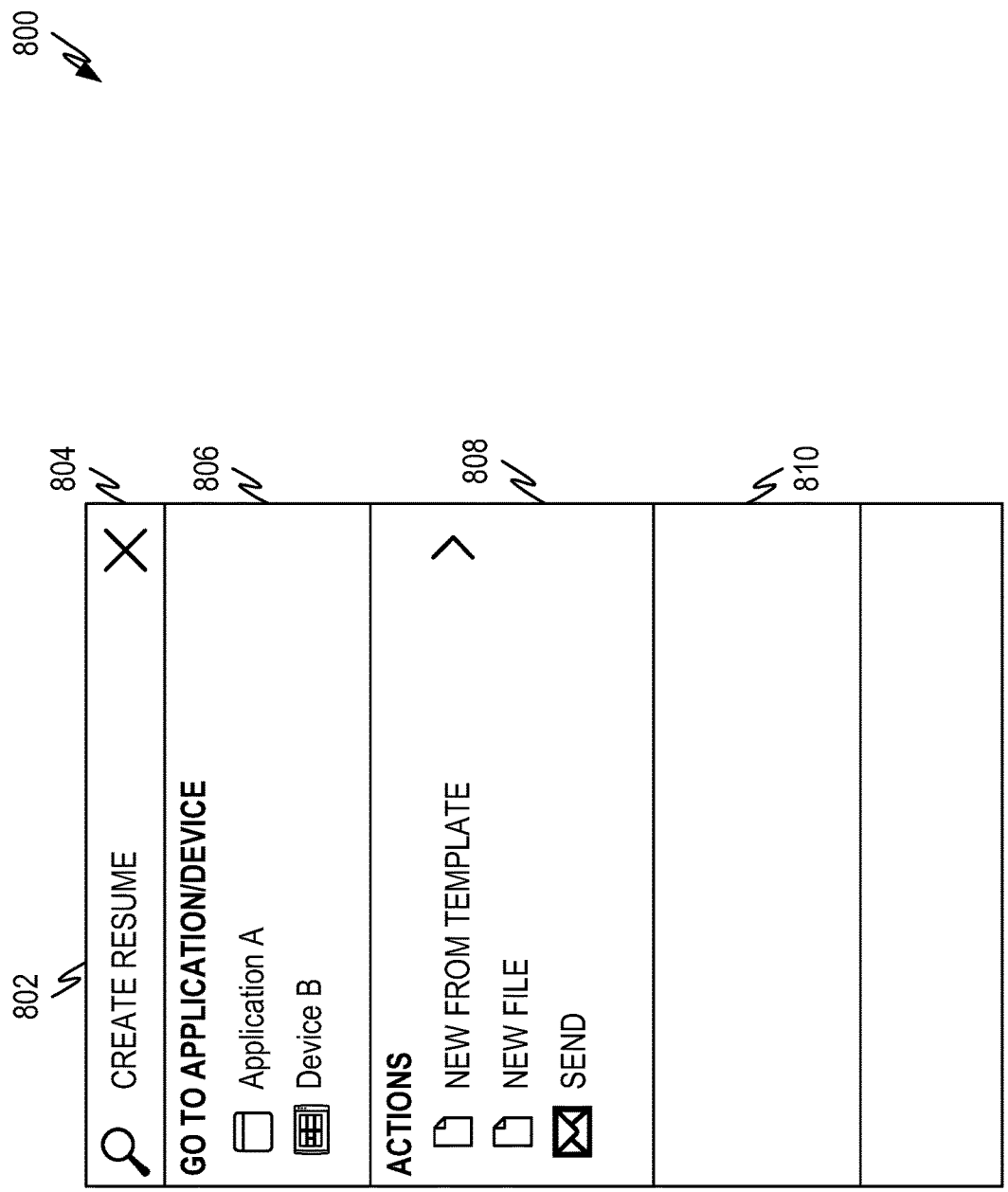
FIG. 8 illustrates an example search user interface according to some aspects of the present disclosure.

FIG. 8 illustrates an example search user interface 800 according to some aspects of the present disclosure. The user interface 802 comprises a search bar 804, a section where the top recommendations are presented 806, and one or more other areas where other recommendations are presented 808, 810. In this example, the user enters the query "create resume" into the search bar 802. Based on the user's intent to create a resume, the application can ascertain that the intent would be better effectuated using another application ("Application A") and/or another form factor ("Device B"). These recommendations, both of which are "external" to the application are presented in area 806. Area 808 presents options that are "internal" to the application but are still likely to allow the user to effectuate the intent to create a resume.

The figures below disclose embodiments which recommend external applications and/or devices that can better effectuate the user's intent.

Figure 9:
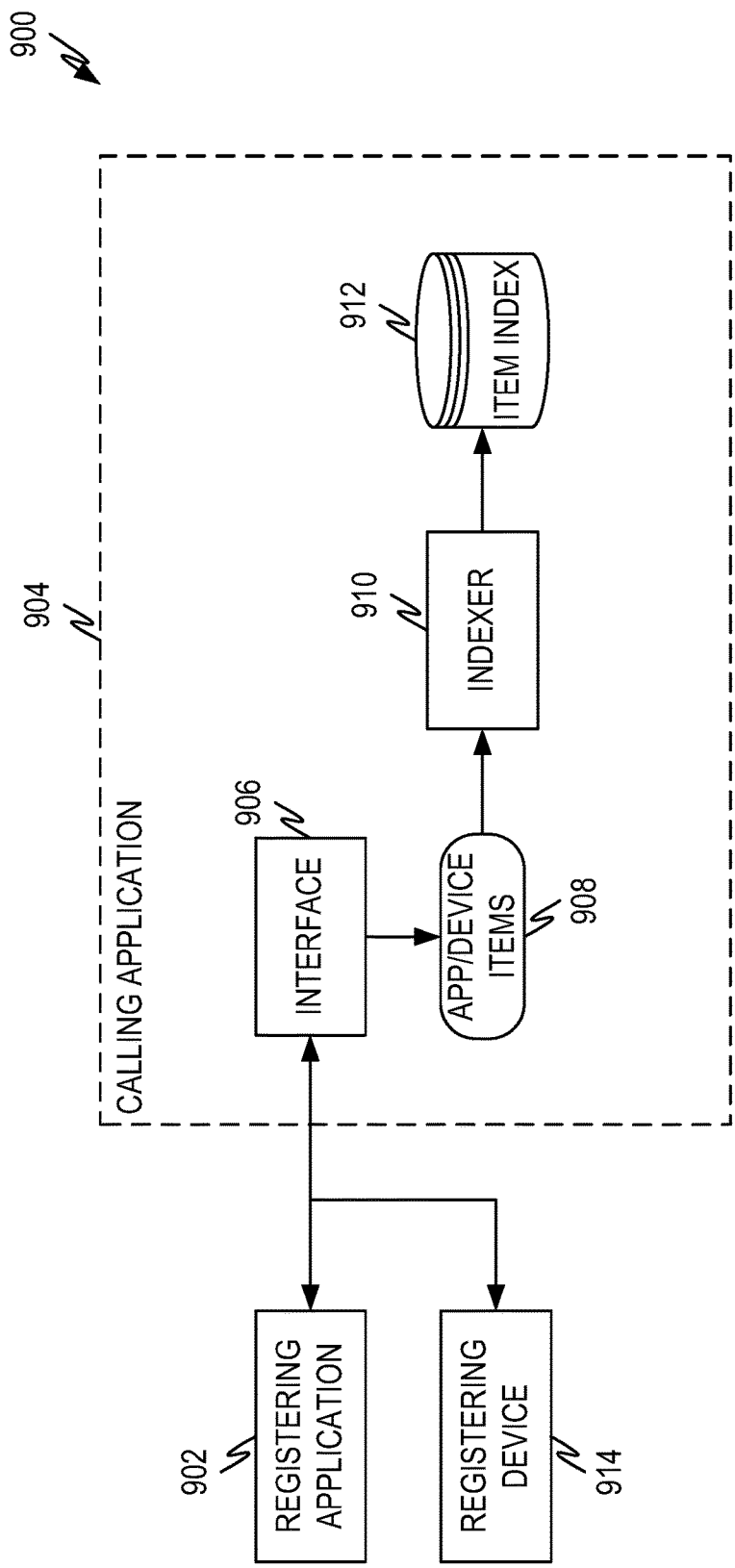
FIG. 9 illustrates an example architecture according to some aspects of the present disclosure.

FIG. 9 illustrates an example architecture 900 according to some aspects of the present disclosure. In this architecture 900, external applications 902 and/or devices 914 can be registered with the application 904 so that their capabilities to effectuate a user's intent can be identified by the application 904. The external applications 902 can execute on the same device as application 904 or can execute on a different device. The devices 914 are different than the device where application 904 executes. They are also devices that the user has access to.

Registration with the application 904 can be accomplished via a registration agent, via the application itself (e.g., registering application 902), or via another mechanism (herein "entity"). The entity performing the registration calls an interface 906 provided by the application 904. The call allows the entity to provide the information to the application 904 that the application 904 will need to know when assessing whether a user's intent can be effectuated using the application 902 and/or device 914. The entity obtains the information for registration and then makes the call to interface 906 to complete the registration.

Applications 902 can provide a wide variety of information as part of the registration. For example, the application 902 can provide the items that the application can work with, such as the type of objects and/or intents that it can work with. For example, the application 902 can inform the calling application 904 that the application 902 works well with tables, can edit photos, can edit videos, the functions it provides, and so forth.

When devices 914 are registered with the calling application 904 they can provide information about their form factor (has keyboard, has touchscreen, screen size, and/or so forth), as well as the applications available to the device and the items provided by the applications. This latter can be similar to and/or the same as the information that is provided about application 902.

The call to the interface 906 provides application 904 with application and/or device items 908. These items can then be provided to an indexer 910 which can create item index entries for the item index 912 in the same manner as previously discussed.

Figure 10:
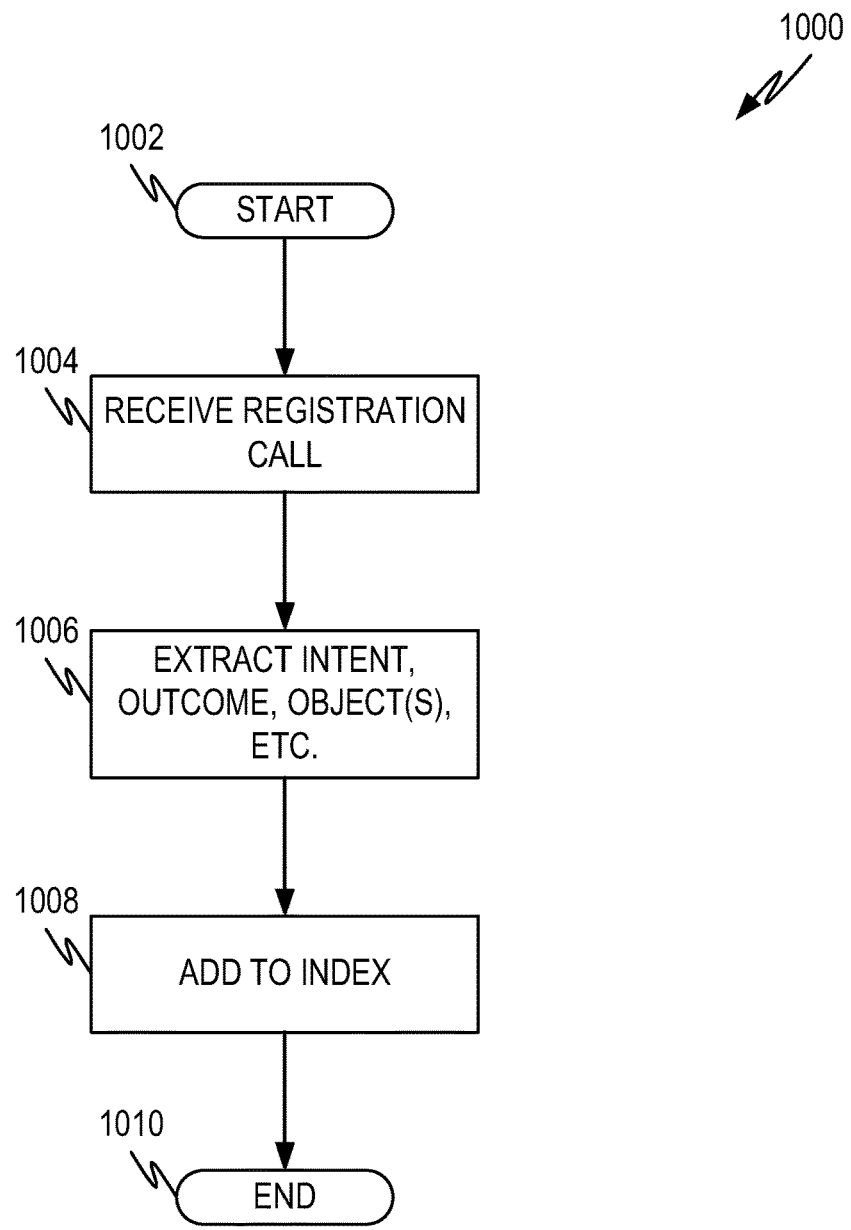
FIG. 10 illustrates an example flow diagram for registering functionality with an application according to some aspects of the present disclosure.

FIG. 10 illustrates an example flow diagram 1000 for registering functionality with an application according to some aspects of the present disclosure. The flow diagram would be executed, for example, by calling application 904.

The method begins at operation 1002 and proceeds to 1004 where a registration call is received, such as via interface 906. The registration call provides application and/or device items as previously described in conjunction with FIG. 9.

Operation 1006 extracts the items (e.g., intents, outcomes, objects, functions, device characteristics, applications, and so forth) as received in the registration call and creates one or more item index entries. The item index entries can be created as discussed herein.

Operation 1008 adds the item index entries to the item index. Making this information available in the item index makes the external information that is provided about other applications and/or device form factors available to the calling application 904. Once the information is made available in the item index, it will be searched and ranked similar to the internal information described herein.

Figure 11:
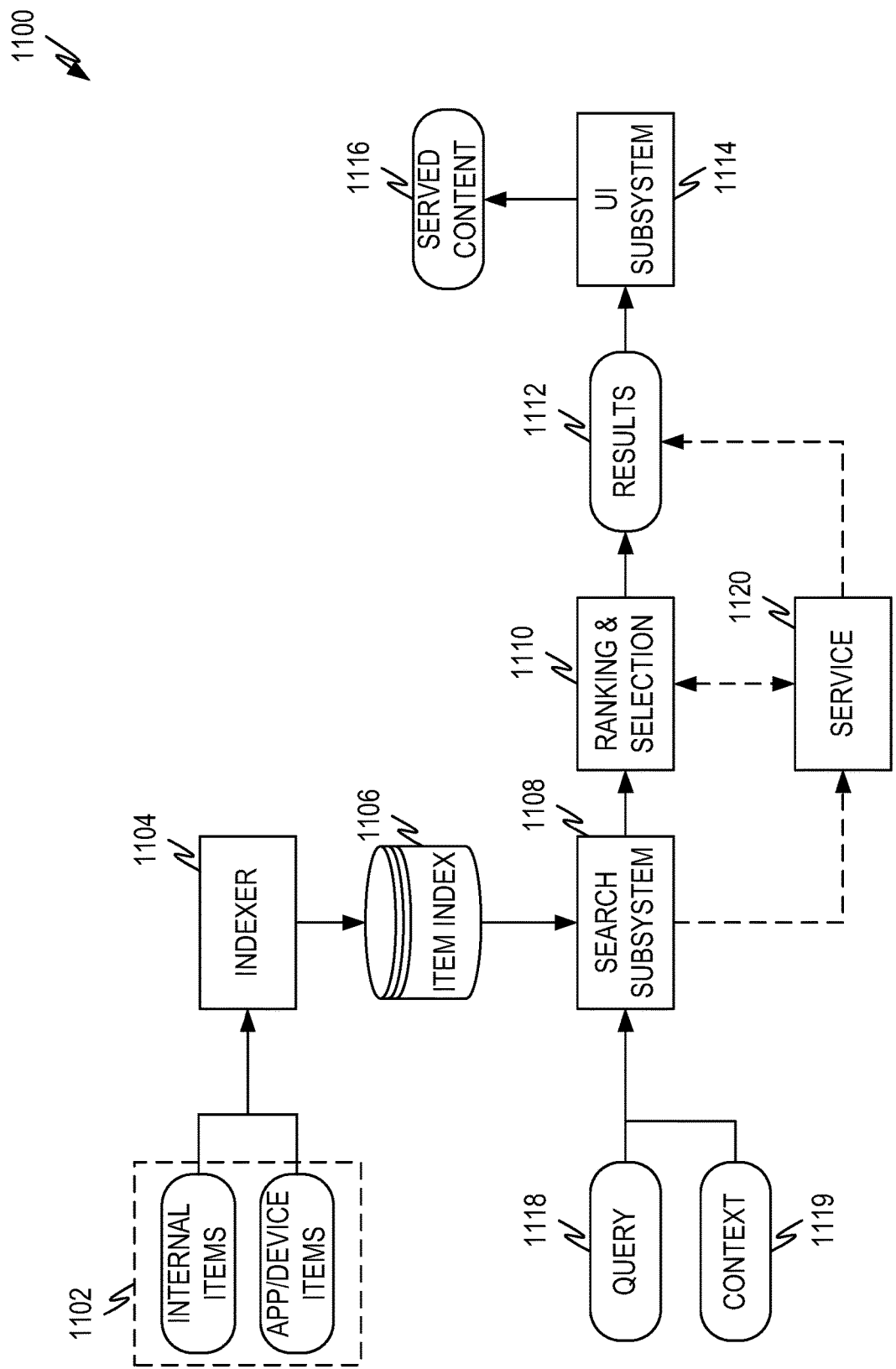
FIG. 11 illustrates an example architecture according to some aspects of the present disclosure.

FIG. 11 illustrates an example architecture 1100 according to some aspects of the present disclosure. The architecture is almost identical to the architecture presented and discussed in conjunction with FIG. 5. The architecture 1100, however, indicates that the content 1102 indexed by indexer 1104 and placed into item index 1106 includes the application and/or device items 1102 that are discussed in conjunction with FIGS. 9 and 10. Thus, the application and/or device items 1102 are made available in item index 1106 via indexer 1104 using the methods discussed in conjunction with FIGS. 9 and 10.

Once the item index 1106 contains entries describing the application and/or device items 1102, the remainder of the architecture 1100 operates, mutatis mutandis, as described in conjunction with FIG. 5 where similarly numbered elements between the figures operate as described. For example, search subsystem 1108 operates as described in conjunction with search subsystem 508 and so forth for the other numbered elements.

In FIG. 5, the ranking and selection process utilizes one or more trained machine learning models to rank items. Similarly, FIG. 11 (e.g., 1110) can utilize one or more trained machine learning models to rank items. In the situation where the item index comprises information from the application and/or devices 1102 (e.g., from the registration process described above), the machine learning models are trained using those items as well as the local items. Additionally, or alternatively, information about the device where the application (e.g., calling application 904, architecture of FIG. 11, and so forth) is executing is also taken into account to help train either the same or a different machine learning model when another device form factor is more appropriate. This can be accomplished, for example, by including device form factor information in the user context and using that context to train an appropriate machine learning model.

As an example of how this would work, consider the following scenario. The user is creating a document on a system that has a touchscreen, an onscreen keyboard, but no keyboard or mouse. The user types into the query box of the application "create resume." The search system 1108 and ranking and selection process 1110 surface a result that includes "Continue on laptop device." Subsequently, the user switches to the same application executing on the laptop device to complete the resume.

Additionally, or alternatively, as discussed in greater detail below, the user can initiate a task on one device and perform some of the task and then switch to a different form factor to complete the task. For example, in a scenario in which an intent like, "create resume," can be done in part on the current device and in part on a different device, the user might complete some actions to get started on a current mobile device (creating sections, importing some content from LinkedIn®, etc.) and complete more complex actions that are better suited for a laptop/desktop device (write summary paragraph, etc.) on a different device.

As discussed above, the combination of user context, the query, and what the user actually did (e.g., switch to the laptop device) are combined into a training data point. This training data point represents annotated data because of the inference of what the "correct" answer is from what the user does after the search results are presented. In this scenario, the user chose to create a resume on a device form factor with a physical keyboard and mouse (or mouse equivalent). Thus, this represents a training data point that form factors with physical keyboards and mice are preferred for a "create resume" intent.

As discussed above, training data points can be aggregated across different groups of users for initial training and/or for updating the model weights and parameters in a feedback loop.

As an alternative to training a machine learning model with both internal items and external application items and/or device items, the internal and external items can be indexed into separate indexes and training data points collected in a manner that allows for training separate machine learning models for internal items and external items. The search subsystem 1108 receives a query 1118 and/or context 1119 and the ranking and selection process 1110, and/or service 1120 operates as previously described except they operate on these items separately and would identify one set of results for internal items and another set of results for external items. These could then be presented differently to the user, such as in separate results areas.

In still another embodiment the items and form factor are separated where a first trained machine learning model selects items via a ranking process as described above. A second machine learning model is trained using items and user context as input data points and a form factor as the output. The predicted form factor predicts a most likely form factor that would best suit a particular item given a particular use context. Training data for this second machine learning model can be identified by gathering item, user context, and form factor tuples and aggregating them across appropriate user groups. For example, the system can gather information on which form factors users select a particular item in a particular user context. This tuple can then be used to train the second machine learning model.

In this embodiment, ranked items are produced as described herein. The subset of ranked items selected as the set of results (e.g., 1112) can then be passed along with the user context to the second trained machine learning model to identify the "best" form factor for the corresponding item given the user context.

In some example embodiments, different machine-learning tools may be used for this second trained machine learning model. For example, Logistic Regression (LR), Naive-Bayes, Random Forest (RF), neural networks (NN) including deep neural networks (DNN), matrix factorization, and Support Vector Machines (SVM) tools may be used for classifying and/or ranking search results.

In one embodiment a deep neural network (DNN) can be used for the second trained machine learning model. The DNN can comprise an embedding layer, one or more convolutional layers, a dropout layer, and one or more fully connected (e.g., Dense) layers. The final layer is an output layer that calculates a ranking score.

In embodiments where the internal items and external items are not treated separately, the item index can identify results by category (e.g., internal, external, internal application, external application, external form factor, and so forth). The search subsystem 1108, ranking and selection process 1110, and/or service 1120 could then separate the ranked search results by category and select an appropriate number of results for the appropriate categories to be presented.

Figure 12:
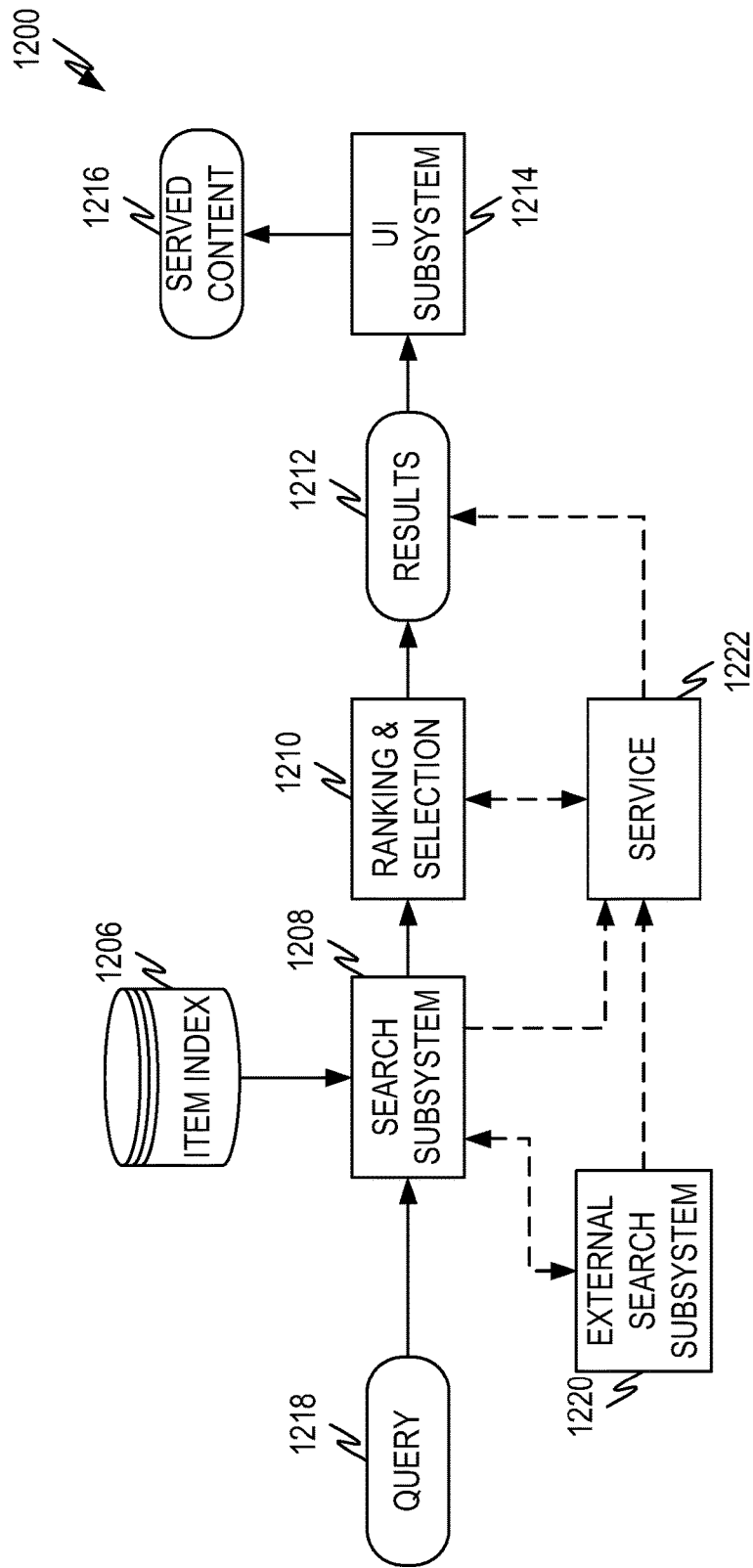
FIG. 12 illustrates an example architecture according to some aspects of the present disclosure.

FIG. 12 illustrates an example architecture 1200 according to some aspects of the present disclosure. The architecture 1200 can be used in conjunction with, or as an alternative to the architectures and flow diagrams presented in FIGS. 9-11. The architecture 1200 represents a different approach to identifying external items for applications and/or form factors.

In FIG. 12, item index 1206 is created as discussed above in conjunction with any of the previous item indexes (e.g., 506, 1106). For example, item index 1206 can comprise local information and remote information accessed locally (such as the contents of a gallery or collection) as described in conjunction with item index 506. Additionally, or alternatively, the item index 1206 can comprise external information such as information related to external applications and/or external form factors (e.g., external application/device items 908, 1102).

Search subsystem 1208 receives a query 1218, e.g., from a user or other source. The search subsystem 1208 searches the item index 1206 and/or passes the query to an external search subsystem 1220. The external search subsystem 1220 can be part of an external application, such as an application that is part of the same suite of applications as the application implementing architecture 1200. The external application can execute on the same device as the application implementing architecture 1200 or a different device. For example, where the two applications are part of a suite of applications, the suite is usually, but not always, installed on or accessible through the same device.

In a first embodiment, the search subsystem 1208 gathers search results from the item index 1206 and/or the external search subsystem 1220, based on the query 1218. A subset (e.g., all or part) of the results from the item index 1206 and/or the external search subsystem 1220 are passed to the ranking and selection process 1210. The ranking and selection process 1210 can utilize one or more trained machine learning models as described herein. The machine learning models can be trained in any manner described herein.

In a second embodiment, the external search subsystem 1220 can return a set of ranked search results so that the results do not need to be reranked by the ranking and selection process 1210.

In still further embodiments, all or part of the search and/or ranking and selection process can be accomplished by one or more externally executing services 1222. The descriptions previously have described how some or all of the functions performed by the local search subsystems and the local ranking and selection processes can be performed using one or more externally executing services. This architecture can operate in the same manner, with part of the search results being supplied by the external search subsystem 1220.

Once the desired number of results have been selected 1212, they can be presented via a user interface 1214, 1216. As noted herein, results from the external search subsystem can be presented in a different user interface area (e.g., 806) if desired or can be presented alongside local search results, or a combination thereof.

Figure 13:
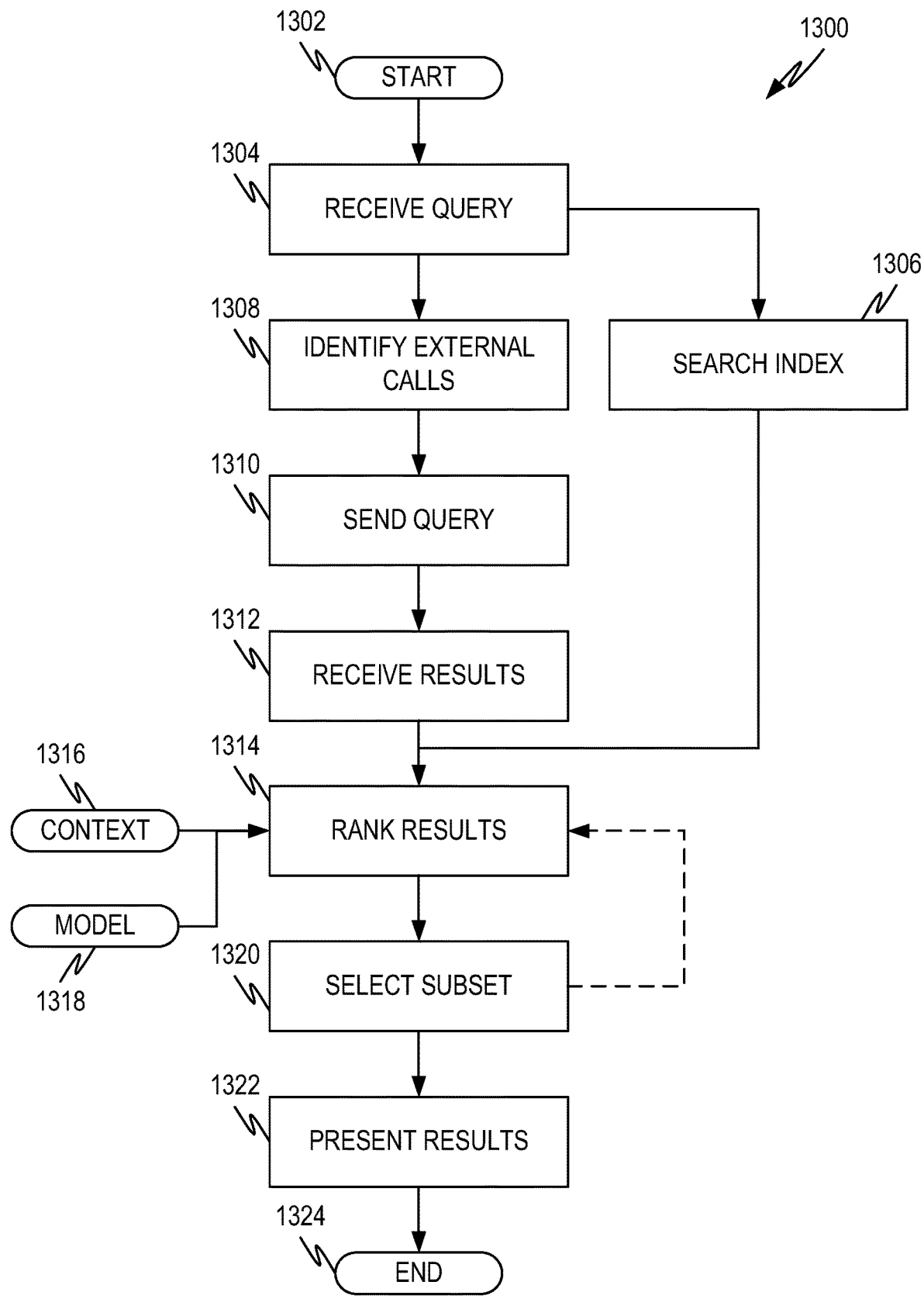
FIG. 13 illustrates an example flow diagram for internal and external search according to some aspects of the present disclosure.

FIG. 13 illustrates an example flow diagram 1300 for internal and external search according to some aspects of the present disclosure. The flow diagram begins at operation 1302 and proceeds to operation 1304 where the query is received such as by search subsystem 1208. The search subsystem can search the local item index, such as item index 1206 to gather local search results.

Additionally, the query can be provided to one or more external search subsystems. External applications which desire to be called to provide search results can register with the application. This registration can comprise informing the application how to access the external search subsystem. For example, the external application can register an API, a callback, or other mechanism that the application can use to access the external search subsystem. Operation 1308 retrieves the mechanisms to access external search subsystems.

Whether an external search subsystem is called can be conditional, so that the call is only made responsive to the occurrence of one or more conditions. Thus, an application may want to be called when the user's intent involves a particular data type or data structure like tables, free form text, JPEG files, video files, and so forth. Additionally, or alternatively, the application may want to be called when the user's intent involves a particular task such as editing a video, creating a resume, and so forth.

Operation 1308 can also identify any conditions and compare them to the current user intent and/or user context to make a decision as to whether a particular external search subsystem will be called.

Operation 1310 sends the query to those external search subsystems that have registered and that have any specified conditions met.

Operation 1312 receives the query results from the external search subsystems that have been called. Operation 1312 can also check for call failure and provide error handling capability in conditions where a called external search subsystem fails to provide results, fails to respond, and so forth.

The local results from operation 1306 and external results from operation 1312 are ranked and subsets selected in operations 1314 and 1320. As described above in conjunction with the ranking and selection operations and operations 708 and 714 of FIG. 7, multiple rounds of selection and ranking can be utilized with different ranking models to select successively smaller subsets. Alternatively, a single round of ranking and selection is used in other embodiments.

The ranking and selection proceed as previously described with at least one of the rounds using a trained machine learning model being used to rank the search results and a desired number of results selected for presentation. The internal and external results can be ranked separately by the same or different trained machine learning models or can be ranked as a combined set.

Furthermore, as previously described the operations may also select a trained machine learning model 1318 from among a set of trained machine learning models based on a selection criteria comprising one or more criteria such as context, user characteristics, user identity, and so forth.

Finally, as previously described herein, the ranking process in operation 1314 can utilize (among other inputs) user context 1316.

Once the subset has been selected for presentation, the results are caused to be presented in operation 1322 such as through one or more user interfaces as described herein.

The method ends at operation 1324.

Thus, the architecture of FIG. 12 and method of FIG. 13 can be used to identify and present external items, such as when a particular intent would be better fulfilled using an external application.

Accomplishing Commands Via Multiple Form Factors

As noted herein some device form factors are more suited to fulfilling a user intent than others. For example, a drawing may be more easily entered with a stylus than a mouse. Additionally, use scenarios and/or use environment may not allow a user to take full advantage of all the features of a given form factor. For example, a user riding in a car may be limited to voice input even though a phone has an onscreen keyboard. Collectively, the form factor and scenario/environment limitations are referred to herein as form factors. This section discusses details, in addition to those presented above, on how an appropriate form factor can be selected and how systems can interact to effectuate a user's intent. This section also presents scenarios where switching form factors would be useful.

As a first scenario, consider a user who is riding in a vehicle and only has voice input into a device, such as a phone, navigation system, digital assistant, and so forth. The user desires to make use of the time to create a document, such as a resume. The user can enter the query "create a resume" using voice. While perhaps not the best form factor to create a printed document, the user has the ability to input information by voice.

The application executing on the device that receives the "create resume" intent may tell the user that the intent is better accomplished with a device that has a keyboard and larger screen. Assuming the user still wishes to proceed, the user can begin dictating content using voice input, which is received by the application. The application begins creating a document with the information input by the user and inserting placeholders for items that the application cannot create or which need further work on a different form factor.

When the user is finished creating the document, the application can ensure the document is in a format that the application on the different form factor can consume. Where a template exists, such as a resume template in this scenario, the application can create a filled in document based on the template with appropriate placeholders. Additionally, or alternatively, the system can create a list of "tasks to complete" that will direct the user on what needs to be finished, such as placeholders that need to be completed, information that was not provided, and/or other items that remain uncompleted by the user. These can be attached to, placed in, or otherwise saved for the user so that the user can access them when she goes to complete the document.

On direction from the user, the application or another entity can open the document on the designated form factor so that the user can complete the task. Additionally, or alternatively, a reminder can be set for the user in the user's calendar, to do list, digital assistant, and/or other application, device, and so forth to remind the user that an unfinished document (the resume in this instance). As one representative example, the system can be set to present the reminder on the target form factor device so that when the user is next on the device, they can open the unfinished resume and complete the task. As another representative example, the system can remind the user via text, email, and so forth, on a periodic or aperiodic schedule that the resume remains uncompleted.

Responsive to the user interacting with the target form factor, such as the user's laptop or other device with a keyboard, the application on the target form factor can be opened and the document presented so that the user can complete the uncompleted items.

As a second scenario, suppose the user is interacting with an application on one form factor and the user wants to perform an action that would be better suited to another form factor. Examples previously given are where a user wants to insert a table but is using a small screen device such as a phone, or a user wants to insert a hand drawn illustration but the user is using a device without a touch screen or stylus.

When the application comes in contact with such an item, the application can insert a placeholder and/or create a "to do" item that the user can finish on the more appropriate form factor. When the user finishes working on the document on the current form factor, the system can remind the user that the document remains unfinished and suggests that the user finish the document on a more appropriate form factor. The application can initiate transfer to the more appropriate form factor if desired.

Figure 14:
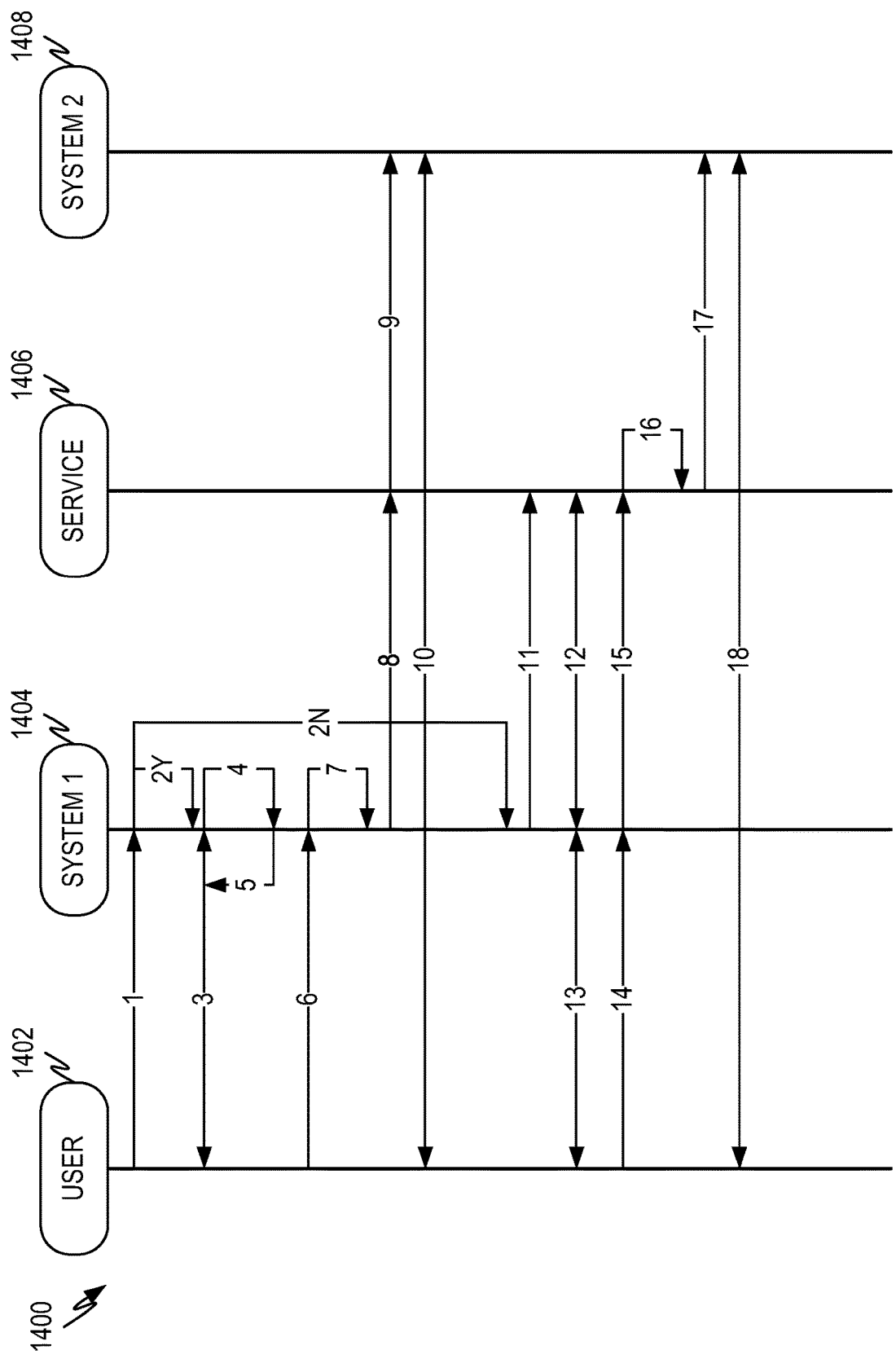
FIG. 14 illustrates an example system interaction diagram according to some aspects of the present disclosure.

Scenarios such as these can be accomplished using the embodiments described herein and the system interactions described in FIG. 14. In FIG. 14, applications executing on the various systems interact with the user and perform the indicated actions. Additionally, a trained machine learning model can be used to identify an appropriate form factor(s) for effectuating the user's intent, performing a task associated with an item, and so forth as described above, such as in conjunction with FIG. 11.

FIG. 14 illustrates an example system interaction diagram 1400 according to some aspects of the present disclosure. In this diagram, there is the user 1402, a first system 1404, a service 1406, and a second system 1408. The systems (1404, 1406, 1408) execute appropriate applications and/or include appropriate functionality as described herein. For example, the first system 1404, the service 1406, and/or the second system 1408 can execute versions of applications that are part of a suite of applications.

Not all embodiments need to have all these systems. For example, a user can directly interact with a service 1406 and thus the functions described in conjunction with the first system 1404 can be performed by service 1406. In yet another example, the functions of the service 1406 can be performed by the first system 1404 and/or the second system 1408 and thus there would be no need for a service 1406.

Other combinations are also possible such as the first system 1404 handling all functions by itself without any interaction with, or handoff to, a service 1406 and/or a second system 1408. This embodiment may work where, for example, the first system 1404 is limited due to the use scenario and/or environment. As an example, a user in a vehicle where the mode of interaction is voice and thus the user cannot enter handwritten notes. However, when the same device is in a different environment, the user can then use the stylus capability of the device to enter the handwritten notes. In such a situation, there may be no need to engage the service and/or handoff to another system.

With that guidance, and from the description below, those of skill in the art will understand how to make and use the various embodiments described above.

Returning now to FIG. 14, a user 1402 interacts with a first system 1404 as indicated by interaction 1. In interaction 1, the user provides an intent to the first system 1404, such as by a query or request to perform a task. In the example scenarios above, that would be "create a resume" or perform some other command, task, and so forth.

The first system 1404 evaluates whether the intent can be at least partially effectuated by the first system 1404. This can be accomplished, for example, by the system checking its item index or determining whether it understands the user intent. Interactions 2Y and 2N illustrate a "YES" and "NO" answer to the inquiry, respectively.

If the first system 1404 can at least partially effectuate the user's intent, the system begins interactions with the user as shown by interaction 3. These interactions allow the user to utilize the first system 1404 to accomplish the user intent. For example, if the user is creating a resume by voice, interaction 3 represents the user 1402 dictating information to the first system 1404 and the first system 1404 appropriately capturing and saving the information. As another example, interaction 3 represents the user 1402 typing information into an application of the first system 1404 and utilizing commands and other items from the application.

As the user interacts with the application of the first system 1404 (interaction 3), the application is checking to see whether a particular item would be better handled by another form factor. This is accomplished by using a machine learning model trained as discussed herein with user context information that captures user preferences for performing certain tasks (e.g., effectuating certain user intents, executing certain commands, and so forth) on certain form factors. Heuristics can be used in conjunction with or in place of the machine learning model. Additionally, or alternatively, the machine learning model can be used to identify a preferred form factor for all or part of the items of the application. The resultant preferences can be downloaded to the application as a pre-computed data store that can be checked as a user interacts with the program to identify a preferred form factor for items in the application.

When a command is entered by a user, either through entering a query or directly selecting a command to be entered, the application checks with the pre-computed data store, the machine learning model, and/or heuristics to identify a preferred form factor. If the current form factor (including use scenario/environment) does not match the current form factor, the application can insert a placeholder and/or a "to-do" to remind the user to finish the task, replace the placeholder, and so forth on the preferred form factor (interaction 4). The application can then return to the user interactions as shown by interaction 5. Additionally, or alternatively, the application can ask the user whether a placeholder and/or to-do should be inserted. Additionally, or alternatively, whether a placeholder and/or to-do are inserted can be controlled by a user controllable setting.

When the user 1402 is finished, or when the user wants to conclude interacting with the current form factor, the user indicates that they are finished by saving the document, closing the application, and/or some other indication, as illustrated in interaction 6.

The first system 1404 takes whatever action is needed to preserve the user's work as indicated by interaction 7. If the user still has work to do on the document because the document has included place holders, has associated to-dos, and/or the user has indicated they want to switch form factors, or any combination thereof, the application and/or the first system 1404 can initiate a switch to the second system 1408. This form factor switch is illustrated by interaction 8 and interaction 9.

The switching from one form factor (e.g., the first system 1404) to another form factor (e.g., the second system 1408) can occur in several ways. In a first embodiment, the application notifies the service 1406 that a form factor switch is desired. The service 1406 can then pass the appropriate files and/or information to the second system 1408. When execution of the appropriate application is initiated on the second system 1408, the application can present the unfinished items to the user.

In a second embodiment, the file with placeholders and/or to-do items are stored in a manner accessible to the appropriate application when executing on the second system 1408. As execution of the appropriate application is initiated, the application can read available to-do items to identify any outstanding files that have open to-dos that need to be addressed by the user. The user can then choose to open one of the files with associated outstanding to-dos and complete the work. As to-dos are accomplished by the user, the application can remove the to-do from the list of to-do items. As an example of how this might work, the file the user is working on is stored in cloud storage or in a manner accessible by the service 1406. A to-do item list is also stored so that files with outstanding to-dos can be identified. For example, if a user has a table to complete, a drawing to insert, and a source to check in a single file, the to-do list can contain an entry that identifies the file with the outstanding to-dos and/or the particular to-do items associated with the file. Additionally, or alternatively, the to-do list can identify the preferred form factor to finish the to-do items.

As the user initiates execution of an application that can complete one or more of the to-do items notified of outstanding to-dos associated with one or more files and/or one or more form factors. For example, upon launch, the application can retrieve the to-do list from the service 1406, from cloud storage, and/or from local storage and parse the list to see if any of the outstanding to-dos can be accomplished by the application and/or form factor. If so, the user can be informed of the files with outstanding to-dos, the form factors that are preferred, and/or the particular to-dos that need to be finished.

In still other embodiments, if both devices (the first system 1404 and the second system 1408) are on and available to the user, the service 1406 can simple initiate a switch and initiate transfer of the session from one device (system 1404) to the other (system 1408) so that the appropriate file/application is closed on the first system 1404 and opened on the second system 1408.

These different mechanisms to switch form factors to keep working on a file are illustrated by interactions 8, 9, and 10.

If the application on the first system 1404 determines that the intent cannot be at least partially effectuated by the first system 1404 (interaction 2N) several options can be taken. In a first embodiment, the user can simple be informed that the intent cannot be effectuated and/or tell the user to use a different application and/or form factor. In this embodiment, the user can be specifically directed. For example, "The current application cannot fulfill your request. Program X, executing on Form Factor A or Form Factor B is recommended." Furthermore, the application can offer to help initiate execution of the appropriate application on the appropriate form factor, should they be available.

In a second embodiment, the system informs the user that a handoff is required and initiates contact with the service 1406 for continued operation. This is the embodiment illustrated in FIG. 14. Upon interaction 2N, the application of the first system 1404 initiates contact with the service 1406 and informs the service of the user intent, information on how to communicate with the user, the application that is initiating the handoff, and/or any other information needed for the handoff. This is illustrated by interaction 11.

Service 1406 then initiates contact with the user 1402 either directly, or via the application and/or the first system 1404. Thus, in some embodiments, the application need not tell the user that the application cannot effectuate the user's intent. The application can contact the service 1406 and relay information between the service 1406 and the user 1404. In other embodiments, the user is informed of the handoff and the user communicates directly with the service or communicates with the service via the application. Interactions 12 and 13 illustrate these various options.

As before when the user finishes, decides to transfer the session to another form factor, and so forth, the user indicates this to the service via interactions 14 and 15 by closing the application, closing the file, initiating a session transfer, and so forth. The service completes the form factor via any of the options discussed above and as illustrated by interactions 16, 17, and 18. The transfer can include the service partially or completely creating a document based on a template, storing place holders, to-dos, and so forth as described herein.

Zero Search User Interface Changes

Embodiments described above can rank search results and/or adjust user interfaces based on an entered query, user context, and\or so forth as described below. Thus, deep items can be easily surfaced based on a query, user context, and/or so forth. However, given past user queries, user context, and other information, the system can be predictive of what the user intent is likely to be if a query is entered. Thus, embodiments can train one or more machine learning models and make predictive changes to a user interface in anticipation of future user intent. This predictive ability is sometimes referred to as "zero search" because the predictive ability is available prior to any query a user may enter.

Figure 15:
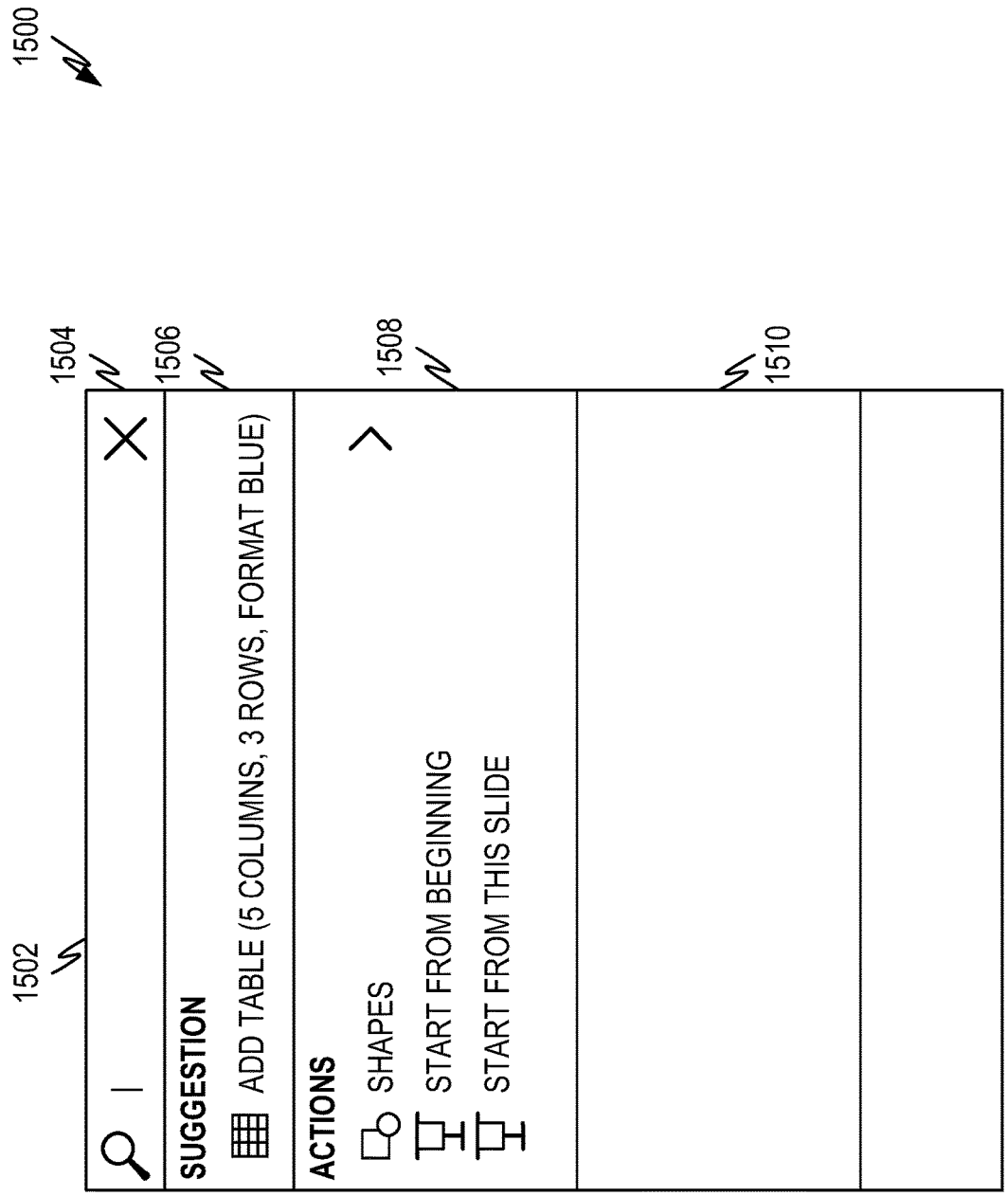
FIG. 15 illustrates an example search user interface according to some aspects of the present disclosure.

FIG. 15 illustrates an example 1500 search user interface 1502 according to some aspects of the present disclosure. The search UI 1502 comprises a search bar 1504 and a plurality of other areas 1506, 1508, 1510 where information can be presented. In this instance one area 1508 is a suggestions area where zero search results can be presented. In the representative example is "add table" along with several parameters including the number of rows and columns in the table as well as the format. Thus, in a first embodiment, the zero search prediction can be for a top level or sub-level item. In a second embodiment, the zero search prediction can be for a top or sub-level item and one or more associated parameters. In a third embodiment, the zero search prediction can comprise one or more associated parameters once a item (top level or sub-level) has been selected. Embodiments of the present disclosure can also combine any aspect of these three embodiments in any combination.

Parameters associated with top level items and/or sub-level items can include any combination of the following representative examples:

Color in color galleries such as font color, highlight color, page color, shape color, and so forth;
    Shape types;
    Font styles;
    Border styles;
    Text effects;
    Header/footer style;
    WordArt style;
    Symbol type;
    Document formatting type;
    Paragraph spacing;

Margin;
Page Size;
Function name (for built in functions such as in spreadsheet applications)
Cell merge type;
Conditional formatting type;
Chart type;
Object arrangement type; and
Any other type of parameters provided by the application.

Figure 16:
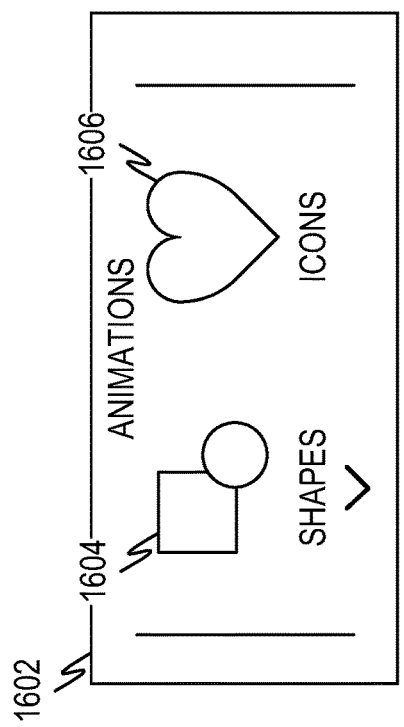
FIG. 16 illustrates an example user interface according to some aspects of the present disclosure.

FIG. 16 illustrates an example 1600 user interface 1602 according to some aspects of the present disclosure. In this example, the UI that is changed is not a search UI, but a top level UI where users can access top level items. For example, the top illustration shows an unmodified UI 1602. This would be the UI before the zero search prediction makes any changes. The UI 1602 comprises an "insert shape" item 1604 which can be activated to bring up a further UI that allows the user to select and insert a shape. The insert shape item 1604 also comprises a dropdown arrow that allows a user to directly select one or more sub-level items.

The UI 1602 also has an "insert icon" item 1606. When selected this item can insert an icon and/or bring up a further UI that allows a user to select and insert an icon.

The zero search prediction can change the top level items, either by promoting a sub-level item, by attaching one or more predicted parameters to the top level item, by attaching one or more predicted parameters to a sub-level item, and/or any combination thereof. In the bottom illustration, the insert shape item has been changed out for a particular shape 1608 predicted to be what the user would want when inserting a shape by the zero search prediction. The shape 1608 retains the drop down arrow so that if the shape isn't correct, the user can access the top level "insert shape" item, or other items as desired.

The UI 1602 also has replaced the general "insert icon" item 1606 with a particular icon 1610 that will be inserted upon selection of the item. The UI can also comprise a mechanism such as a drop down arrow to allow access to the original top level item and/or other items.

Figure 17:
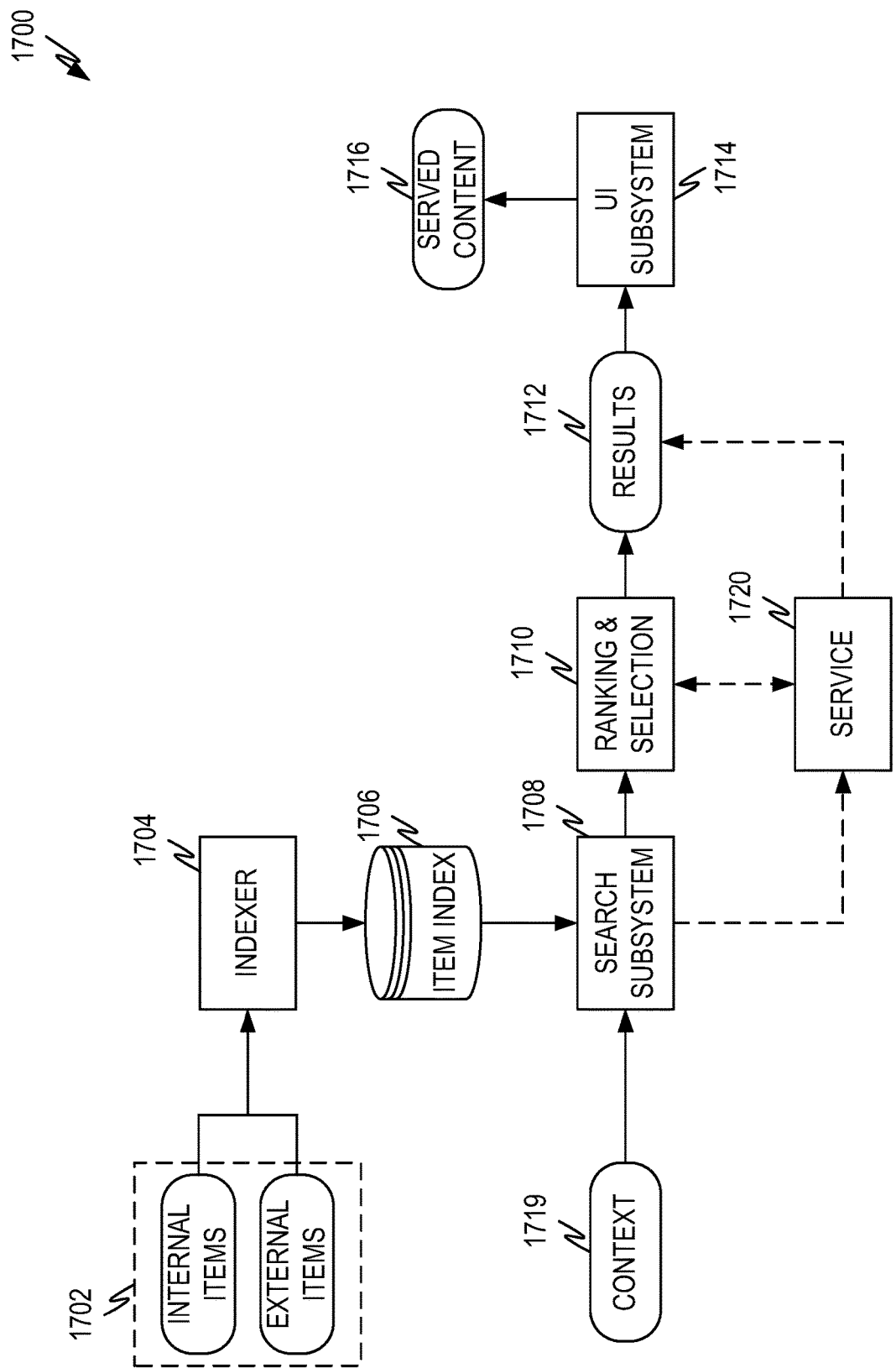
FIG. 17 illustrates an example architecture according to some aspects of the present disclosure.

FIG. 17 illustrates an example architecture 1700 according to some aspects of the present disclosure. This architecture has internal and/or external items 1702 that are processed by an indexer 1704 to build an item index 1706. Mutatis mutandis, these operate as discussed in conjunction with the other architectures of this application, with similarly numbered items operating similarly.

As previously discussed, in a zero search scenario, the system can predict at least one of: 1) one or more items; 2) one or more items and their associated parameters; and/or 3) when a user selects a item, predict one or more parameters associated with the item that the user likely wants. Any combination of these different predicted items can be accomplished using the architecture of FIG. 17 as explained herein.

These predicted items can be generated upon several types of triggers. For example, a user can select the "search" item to open a search UI as illustrated in FIG. 15. The application determines a set of results that will be displayed to the user prior to the user entering a query. The results are the predicted one or more items. Additionally, the system can predict one or more parameters associated with one or more of the predicted items. This can happen either before a user selects an item or after a user selects a item from the list.

Determining which items should be in the UI prior to the user entering the query can be performed in several ways. In one representative example, prior to the user entering a query, the search subsystem 1708 retrieves the user context 1719, which includes the information described above but does not include a query. The search subsystem 1708 searches the item index 1706 and retrieves search results based on the user context 1719. The ranking and selection process 1710 ranks the search results based on the context and other information using a machine learning process and/or other ranking mechanisms as previously described in conjunction with the other architectures herein. The output of the ranking and selection process 1710 is a set of results 1712. The set of results 1712 represent items presented to the user in the UI.

In another representative example, the system does not search the item index nor rank results from the item index. Rather, the user context 1719 is presented to a trained machine learning model which uses the context to predict items and/or parameters to be presented to the user. This trained machine learning model may be different from the ranking machine learning model and different from the machine learning model that predicts which form factor is best suited to effectuate user intent. As discussed herein, machine learning models can be on the local machine, accessed via a service 1720, or any combination thereof.

In this representative example, the machine learning model can be accessed via a service 1720, can be accessed by the search subsystem 1708 and/or ranking and selection process 1710, or any combination thereof.

As discussed above, numerous machine learning models can be effectively utilized in embodiments of the present disclosure. For example, Logistic Regression (LR), Naive-Bayes, Random Forest (RF), neural networks (NN) including deep neural networks (DNN), matrix factorization, and Support Vector Machines (SVM) tools may be used for predicting items and/or parameters associated therewith.

In one a representative embodiment, a deep neural network (DNN) comprising a plurality of layers is used. The plurality of layers comprises an embedding layer, one or more convolutional layers, a dropout layer, and one or more fully interconnected (e.g., Dense) layer, and a fully interconnected (e.g., Dense) output layer which predicts the parameter of interest. For example, where an item such as insert a shape has an associated gallery such as a gallery of shapes, the final layer predicts a parameter index in the gallery of shapes. In items which do not have a "gallery" in the traditional sense, the available choices can be treated as a gallery of choices. For example, in a page formatting item in which the margins of the page are parameters, the various combinations of margins can be treated as a gallery so that the trained machine learning model can predict the most likely combination of margins.

The machine learning model that predicts parameters can be trained by collecting data points comprising the user context, a relevant item, and the parameters associated with that relevant item. For example, a user interacts with the system thus creating user context. The user then selects the text color item and selects a particular color for the text color from the associated color gallery. This tuple represents a data point that comprises the user context (input), the text color item (input), and the particular color (output). Such tuples can be aggregated across appropriate groups of users as described herein to accumulate training data which can then be used to train the machine learning model that predicts parameters for an item given user context.

Example Machine Architecture and
Machine-Readable Medium

Figure 18:
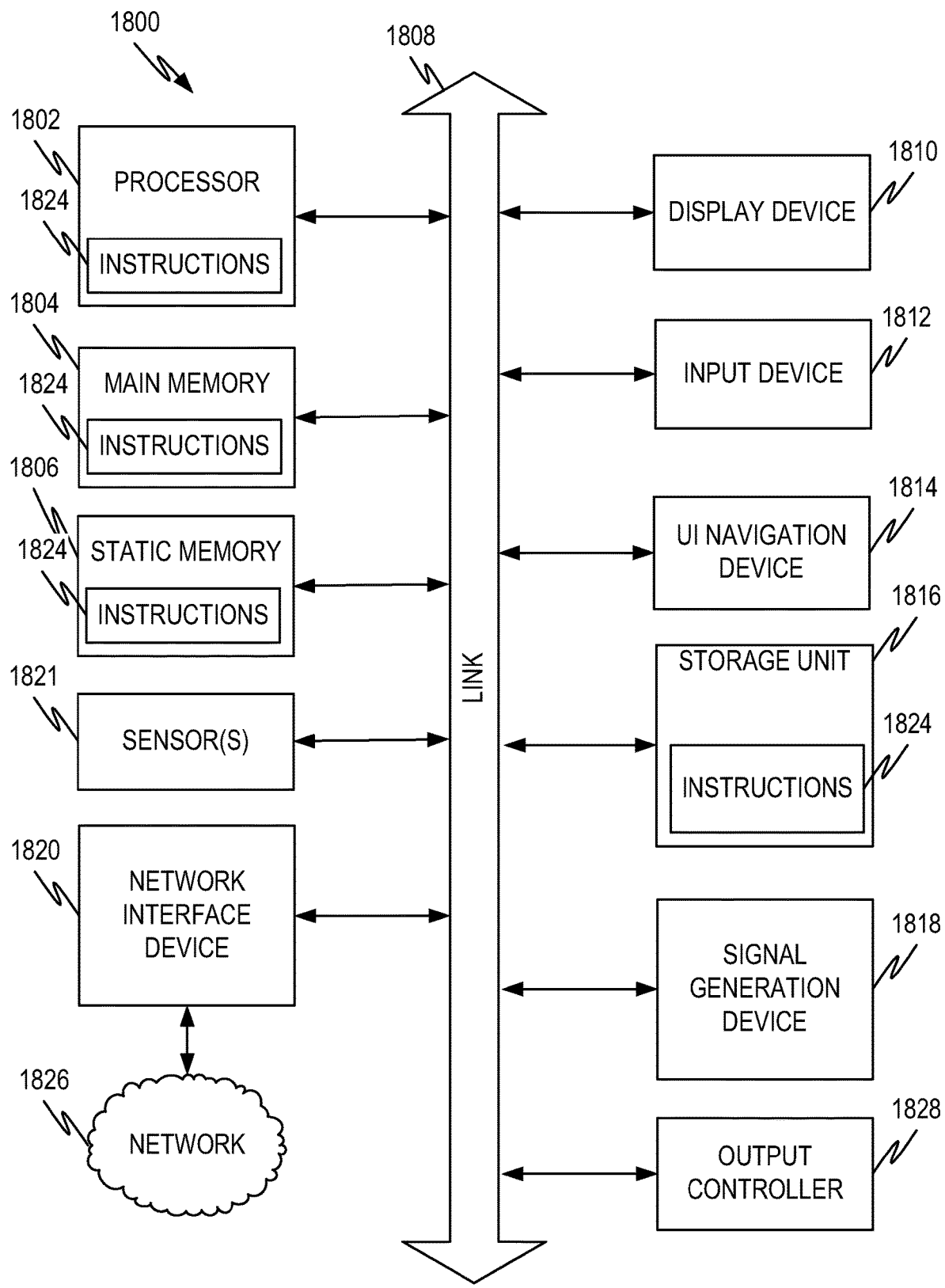
FIG. 18 illustrates a representative architecture for implementing the systems and other aspects disclosed herein or for executing the methods disclosed herein.

FIG. 18 illustrates a representative machine architecture suitable for implementing the systems and so forth or for executing the methods disclosed herein. The machine of FIG. 18 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 18 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1800 includes at least one processor 1802 (e.g., a central processing unit (CPU), a graphics processing unit (GPU), advanced processing unit (APU), or combinations thereof), one or more memories such as a main memory 1804, a static memory 1806, or other types of memory, which communicate with each other via link 1808. Link 1808 may be a bus or other type of connection channel. The machine 1800 may include further optional aspects such as a graphics display unit 1810 comprising any type of display. The machine 1800 may also include other optional aspects such as an alphanumeric input device 1812 (e.g., a keyboard, touch screen, and so forth), a user interface (UI) navigation device 1814 (e.g., a mouse, trackball, touch device, and so forth), a storage unit 1816 (e.g., disk drive or other storage device(s)), a signal generation device 1818 (e.g., a speaker), sensor(s) 1821 (e.g., a global positioning sensor, accelerometer(s), microphone(s), camera(s), and so forth), output controller 1828 (e.g., wired or wireless connection to connect and/or communicate with one or more other devices such as a universal serial bus (USB), near field communication (NFC), infrared (IR), serial/parallel bus, etc.), and a network interface device 1820 (e.g., wired and/or wireless) to connect to and/or communicate over one or more networks 1826.

Executable Instructions and Machine-Storage Medium

The various memories (i.e., 1804, 1806, and/or memory of the processor(s) 1802) and/or storage unit 1816 may store one or more sets of instructions and data structures (e.g., software) 1824 embodying or utilized by any one or more of the methodologies or functions described herein. These instructions, when executed by processor(s) 1802 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1. A method for command search, comprising:
receiving a query from a user, the query representing a request about functionality of an application;
searching an index using the query, the index comprising both top level and sub-top level functionality accessible by a user within the application;
receiving a plurality of results in response to the search;
accessing context comprising results of user interactions with the application;
presenting the context and a subset of the plurality of results to a trained machine learning model, the trained machine learning model having been previously trained using a combination of context and results;
receiving a ranking for each result in the subset;
selecting a subset of the ranked results; and
presenting the subset of the ranked results to the user.
Example 2. The method of example 1 further comprising:
identifying a top-level command accessible by the user through a user interface of the application;
identifying a sub-level command of the top-level command, the sub-level command accessible by the user through a second user interface;
creating an index entry for the top-level command, the index entry comprising top level functionality;

creating a second index entry for the sub-level command, the second index entry comprising sub-level functionality.

Example 3. The method of example 2 wherein the second index entry further comprises one or more parameters associated with the sub-level functionality.

Example 4. The method of example 1, 2, or 3 wherein the context and results used to train the machine learning model comprises aggregate context and results for a plurality of users.

Example 5. The method of example 1, 2, 3, or 4 wherein the context and results used to train the machine learning model comprises aggregate context and results for a plurality of users from a common tenancy.

Example 6. The method of example 1, 2, 3, 4, or 5 further comprising:
monitoring the user's interaction with the presented subset of the ranked results;
capturing the user's interaction and the context;
using the captured user's interaction and context to adjust parameters in the trained machine learning model to further train the trained machine learning model.

Example 7. The method of example 1, 2, 3, 4, 5, or 6 wherein the trained machine learning model resides on a service and wherein presenting the context and the subset of the plurality of results comprises sending the context and the subset of the plurality of results to the service.

Example 8. The method of example 1, 2, 3, 4, 5, 6, or 7 wherein the index further comprises functionality accessible in an external application and wherein the plurality of results received in response to the search comprise results related to the application and results related to the external application.

Example 9. The method of example 1, 2, 3, 4, 5, 6, 7, or 8 wherein the operations further comprise:
receiving a registration request from a second application comprising information regarding functionality of the second application; and
creating at least one entry into the index related to the information received in the registration request.

Example 10. The method of example 1, 2, 3, 4, 5, 6, 7, 8, or 9 further comprising:
sending the query to a second application;
receiving at least one search result from the second application; and
including the at least one search result in the subset of the plurality of results.

Example 11. The method of example 1, 2, 3, 4, 5, 6, 7, 8, 9, or 10 further comprising:
prior to receiving the query, performing the operations comprising:
accessing the context;
search the index using information from the context;
rank results received responsive to searching the index using information from the context;
select a subset of the ranked results; and
modify at least one user interface to present the selected subset.

Example 12. The method of example 1, 2, 3, 4, 5, 6, 7, 8, 9, 10, or 11 wherein the operations further comprise:
identifying an intent of the user that is better fulfilled by another application;
presenting an option to the user to switch to the other application.

Example 13. The method of example 1, 2, 3, 4, 5, 6, 7, 8, 9, 10, 11, or 12 wherein the operations further comprise:
receiving interactions from the user adding information to a document managed by the application;
identifying content better handled by different device;
responsive to identifying content better handled by a different device:
inserting a placeholder into the document; and
adding an indication to complete the placeholder.

Example 14. An apparatus comprising means to perform a method as in any preceding example.

Example 15. Machine-readable storage including machine-readable instructions, when executed, to implement a method or realize an apparatus as in any preceding example.

Example 16. A method for command search, comprising:
receiving a query from a user, the query representing a request about functionality of an application;
searching an index using the query, the index comprising both top level and sub-top level functionality accessible by a user within the application;
receiving a plurality of results in response to the search;
accessing context comprising results of user interactions with the application;
presenting the context and a subset of the plurality of results to a trained machine learning model, the trained machine learning model having been previously trained using a combination of context and results;
receiving a ranking for each result in the subset;
selecting a subset of the ranked results; and
presenting the subset of the ranked results to the user.

Example 17. The method of example 16 further comprising:
identifying a top-level command accessible by the user through a user interface of the application;
identifying a sub-level command of the top-level command, the sub-level command accessible by the user through a second user interface;
creating an index entry for the top-level command, the index entry comprising top level functionality;
creating a second index entry for the sub-level command, the second index entry comprising sub-level functionality.

Example 18. The method of example 17 wherein the second index entry further comprises one or more parameters associated with the sub-level functionality.

Example 19. The method of example 16 wherein the context and results used to train the machine learning model comprises aggregate context and results for a plurality of users.

Example 20. The method of example 16 wherein the context and results used to train the machine learning model comprises aggregate context and results for a plurality of users from a common tenancy.

Example 21. The method of example 16 further comprising:
monitoring the user's interaction with the presented subset of the ranked results;
capturing the user's interaction and the context;
using the captured user's interaction and context to adjust parameters in the trained machine learning model to further train the trained machine learning model.

Example 22. The method of example 16 further comprising selecting the trained machine learning model from among a plurality of trained machine learning models.

Example 23. The method of example 16 wherein the trained machine learning model resides on a service and wherein presenting the context and the subset of the plurality of results comprises sending the context and the subset of the plurality of results to the service.

Example 24. The method of example 16 wherein the trained machine learning model resides on the machine executing the method of example 16.

Example 25. The method of example 16 wherein the index further comprises functionality accessible in an external application and wherein the plurality of results received in response to the search comprise results related to the application and results related to the external application.

Example 26. A system comprising a processor and computer executable instructions, that when executed by the processor, cause the system to perform operations comprising:
  receiving a query from a user, the query representing a request about functionality of an application;
  searching an index using the query, the index comprising both top level and sub-top level functionality accessible by a user within the application;
  receiving a plurality of results in response to the search;
  accessing context comprising results of user interactions with the application;
  presenting the context and a subset of the plurality of results to a trained machine learning model, the trained machine learning model having been previously trained using a combination of context and results;
  receiving a ranking for each result in the subset;
  selecting a subset of the ranked results; and
  presenting the subset of the ranked results to the user.

Example 27. The system of example 26 wherein the operations further comprise:
  identifying a top-level command accessible by the user through a user interface of the application;
  identifying a sub-level command of the top-level command, the sub-level command accessible by the user through a second user interface;
  creating an index entry for the top-level command, the index entry comprising top level functionality;
  creating a second index entry for the sub-level command, the second index entry comprising sub-level functionality.

Example 28. The system of example 27 wherein the second index entry further comprises one or more parameters associated with the sub-level functionality.

Example 29. The system of example 26 wherein the operations further comprise:
  receiving a registration request from a second application comprising information regarding functionality of the second application; and
  creating at least one entry into the index related to the information received in the registration request.

Example 30. The system of example 26 further comprising:
  sending the query to a second application;
  receiving at least one search result from the second application; and
  including the at least one search result in the subset of the plurality of results.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computing system comprising:
a processor; and
memory storing instructions that, when executed by the processor, cause the processor to perform acts comprising:
  receiving, by way of a productivity application that belongs to a suite of productivity applications, a query from a user who is associated with a tenancy, the query representing a request about functionality of the application;
  searching an index based upon the query, the index indexes information about both top level and sub top-level functionality of the application, the top level and sub-top level functionality is accessible to the user within the application;
  receiving results in response to the search;
  providing the results to a trained machine learning model that is customized for the tenancy, the trained machine learning model having been previously trained based upon training data that is associated with the tenancy;
  receiving, from the trained machine learning model, a respective ranking for each result in the results;
  selecting a result from the ranked results; and
  causing the selected result to be presented to the user.

2. The computing system of claim 1, wherein the tenancy is associated with an installation of the productivity application across several computing devices of a company.

3. The computing system of claim 1, the acts further comprising:
  accessing context for the user, the context comprising results of interactions of the user with the application;
  providing the context to the trained machine learning model, wherein the respective ranking for each result in the results is based upon the context.

4. The computing system of claim 3, wherein the context further comprises second results of second interactions of users in the tenancy with the application.

5. The computing system of claim 1, the acts further comprising:
  accessing context for the user, the context comprising results of interactions of the user with a second application in the suite of productivity applications; and
  providing the context to the trained machine learning model, wherein the respective ranking for each result in the results is based upon the context.

6. The computing system of claim 5, wherein the context further comprises second results of second interactions of users in the tenancy with the second application.

7. The computing system of claim 1, the acts further comprising:
  identifying a top-level command accessible by the user through a user interface of the application;
  identifying a sub top-level command of the top-level command, the sub top-level function accessible by the user through a second user interface;
  creating an index entry in the index for the top-level command, the index entry comprises a top-level function; and
  creating a second index entry for the sub top-level command, the second index entry comprising a sub top-level function.

8. The computing system of claim 1, the acts further comprising:

selecting the trained machine learning model from amongst several machine learning models based upon the tenancy.

9. The computing system of claim 1, the acts further comprising:
providing the query to a second application in the suite of productivity applications;
receiving a search result from the second application in response to providing the query to the second application; and
causing the search result to be presented to the user together with the selected result.

10. The computing system of claim 1, wherein the index includes an entry that comprises functionality of a second application in the suite of productivity applications, the acts further comprising:
identifying the entry based upon the query; and
causing the functionality of the second application to be presented to the user concurrently with the search result.

11. A method performed by a computing system, the method comprising:
receiving, by way of an application that belongs to a suite of productivity applications, a query pertaining to functionality of the application from a user who is associated with a tenancy;
in response to receipt of the query, searching a computer-implemented index to identify search results, wherein the computer-implemented index includes first entries that represent top-level functions of the application and second entries that represent sub top-level functions of the application;
ranking the search results based upon the tenancy, wherein a most highly ranked search result in the search results represents a sub top-level function;
selecting the most highly ranked search result; and
causing the most highly ranked search result to be presented to the user such that the sub top-level function is presented.

12. The method of claim 11, wherein ranking the search results based upon the tenancy comprises providing the search results to a machine learning model that has been trained based upon training data that comprises interactions of users associated with the tenancy with the application, wherein the machine learning model ranks the search results.

13. The method of claim 12, wherein the training data further comprises interactions of the users associated with the tenancy with a second application in the suite of productivity applications.

14. The method of claim 11, wherein the tenancy is associated with an installation of the productivity application across several computing devices of a company.

15. The method of claim 11, further comprising selecting the trained machine learning model from amongst several machine learning models based upon the tenancy.

16. The method of claim 11, wherein ranking the search results based upon the tenancy comprises providing the search results to a machine learning model that is customized for the tenancy.

17. A computer storage medium comprising instructions that, when executed by a processor, cause the processor to perform acts comprising:
receiving, by way of an application that belongs to a suite of productivity applications, a query pertaining to functionality of the application from a user who is associated with a tenancy;
in response to receipt of the query, searching a computer-implemented index to identify search results, wherein the computer-implemented index includes first entries that represent top-level functions of the application and second entries that represent sub top-level functions of the application;
ranking the search results based upon the tenancy, wherein a most highly ranked search result in the search results represents a sub top-level function;
selecting the most highly ranked search result; and
causing the most highly ranked search result to be presented to the user such that the sub top-level function is presented.

18. The computer storage medium of claim 17, wherein ranking the search results based upon the tenancy comprises providing the search results to a machine learning model that has been trained based upon training data that comprises interactions of users associated with the tenancy with the application, wherein the machine learning model ranks the search results.

19. The computer storage medium of claim 18, wherein the training data further comprises interactions of the users associated with the tenancy with a second application in the suite of productivity applications.

20. The computer storage medium of claim 17, wherein the tenancy is associated with an installation of the productivity application across several computing devices of a company.

* * * * *